United States Patent

[11] 3,569,677

| [72] | Inventors | William E. Bray;<br>Julian C. Hart, Houston, Tex. |
|---|---|---|
| [21] | Appl. No. | 512,154 |
| [22] | Filed | Dec. 7, 1965 |
| [45] | Patented | Mar. 9, 1971 |
| [73] | Assignee | Texas Instruments Incorporated<br>13500 North Central Expressway, Dallas, Tex. |

[54] DATA READOUT SYSTEM
21 Claims, 26 Drawing Figs.

[52] U.S. Cl. ..................................................... 235/92,
340/146.2, 307/222
[51] Int. Cl. ....................................................... G06m 3/08,
G06m 3/14, G06f 7/02
[50] Field of Search........................................... 235/177,
154, 152, 151.11, 92 (28), 92 (50), 92 (66),
151.31, 92 (66,50,65,28), 92, 29 (TF),29 (F);
340/146.2; 307/222, 224; 328/43, 44, 45; 324/78

[56] References Cited
UNITED STATES PATENTS

| 3,217,293 | 11/1965 | Metz | 340/146.2 |
|---|---|---|---|
| 3,237,025 | 2/1966 | Clapper | 340/146.2 |
| 3,268,713 | 8/1966 | Klinikowski | 235/92(66) |
| 3,297,859 | 1/1967 | Reiser | 235/92(66) |
| 3,308,279 | 3/1967 | Kelling | 235/92(28) |
| 3,319,054 | 5/1967 | Kelling | 235/92(28) |
| 3,364,340 | 1/1968 | McGarrell | 235/92(28) |
| 2,913,664 | 11/1959 | Wang | 324/78 |
| 2,992,384 | 7/1961 | Malbrain | 324/78 |
| 3,219,935 | 11/1965 | Katakami | 324/78 |
| 3,221,250 | 11/1965 | Wang | 324/78 |
| 3,137,839 | 6/1964 | Rubin | 340/146.2 |
| 3,166,733 | 1/1965 | Schuman | 340/146.2 |
| 3,192,478 | 6/1965 | Metz | 328/44 |
| 3,272,971 | 9/1966 | Klinikowski | 235/92 |
| 3,340,386 | 9/1967 | Hurst | 235/92 |
| 3,390,378 | 6/1968 | Dryden | 340/146.2 |
| 3,400,388 | 9/1968 | Blank | 340/336 |

OTHER REFERENCES
Sect 1708 & 1709 "HANDBOOK OF AUTOMATION, COMPUTATION AND CONTROL," Vol 2; edited by Grabbe, Ramo and Woolridge published Oct. 12, 1959

*Primary Examiner*—Maynard R. Wilbur
*Assistant Examiner*—Joseph M. Thesz, Jr.
*Attorneys*—Samuel M. Mims, Jr., James O. Dixon, Andrew M. Hassell, John E. Vandigriff, Harold Levine and Richards, Harris & Hubbard ABSTRACT: A system for automatically making substantially any static or dynamic test on a multilead integrated circuit. The system includes a test station having a plurality of DC bias supplies, a plurality of pulse generators for producing repetitive pulse waveforms, a socket for receiving the integrated circuit, switch means for selectively connecting any DC bias supply and/or any pulse generator to any lead or leads of the integrated circuit, and sensing means for selectively connecting any lead of the integrated circuit to either a static measuring unit or a dynamic measuring unit. The dynamic measuring unit makes either time or amplitude measurements on the signal at any lead of the integrated circuit and produces a pulse train and a count data signal which are collectively representative of the magnitude of the time or amplitude measurement. The static measuring unit makes either static voltage or current measurements on the signal at any selected lead of the integrated circuit and produces a pulse train signal the frequency of which is representative of the magnitude of the measurement. A data readout system counts the pulses either from the dynamic measuring unit during the count data signal, or the pulses from the static measuring unit during a predetermined reference time period to indicate the results of the measurement. A programmable control means automatically operates the total system to make substantially any selected amplitude, time, voltage or current measurement on the signal occurring at or between substantially any lead or leads of the integrated circuit.

PATENTED MAR 9 1971  3,569,677

INVENTORS:
**WILLIAM E. BRAY,
JULIAN C. HART**

*E. Mickey Hubbard*
ATTORNEY

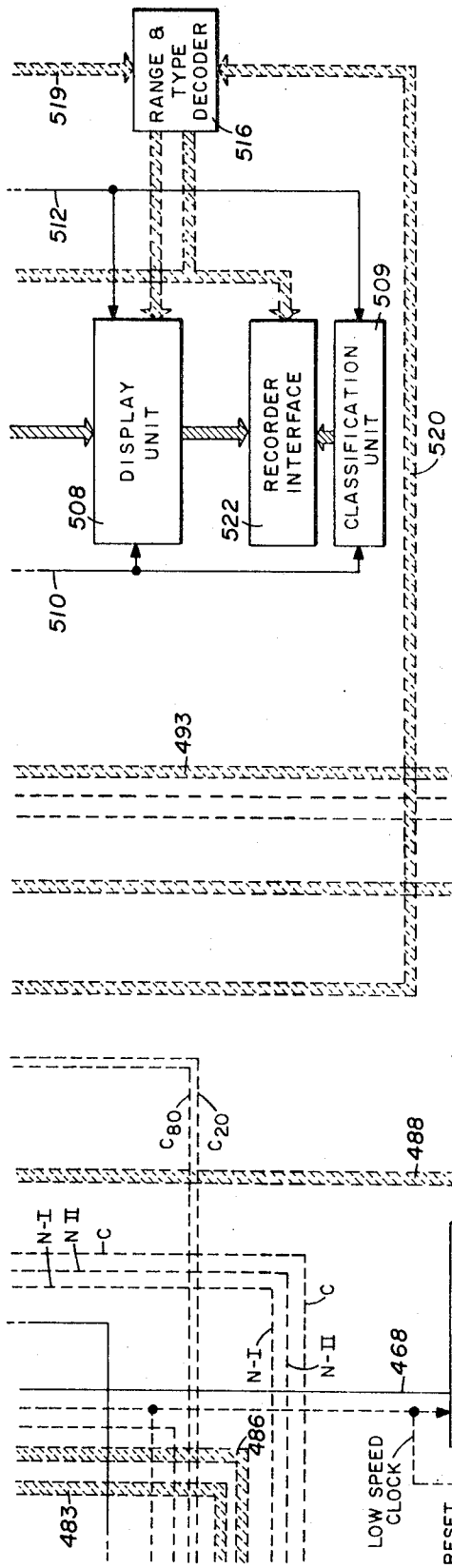
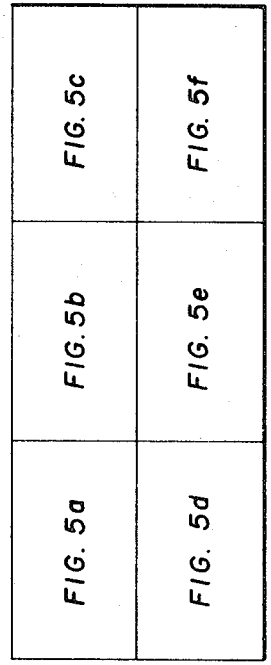
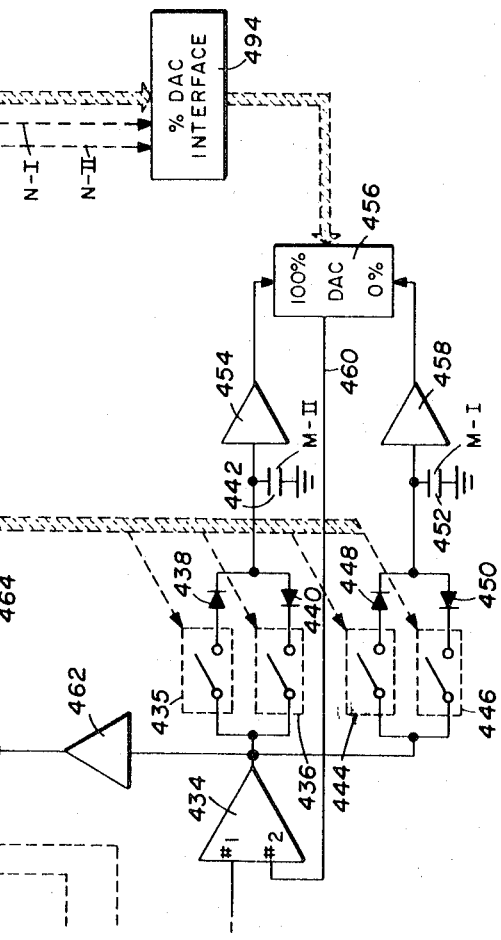
FIG. 5f
FIG. 6

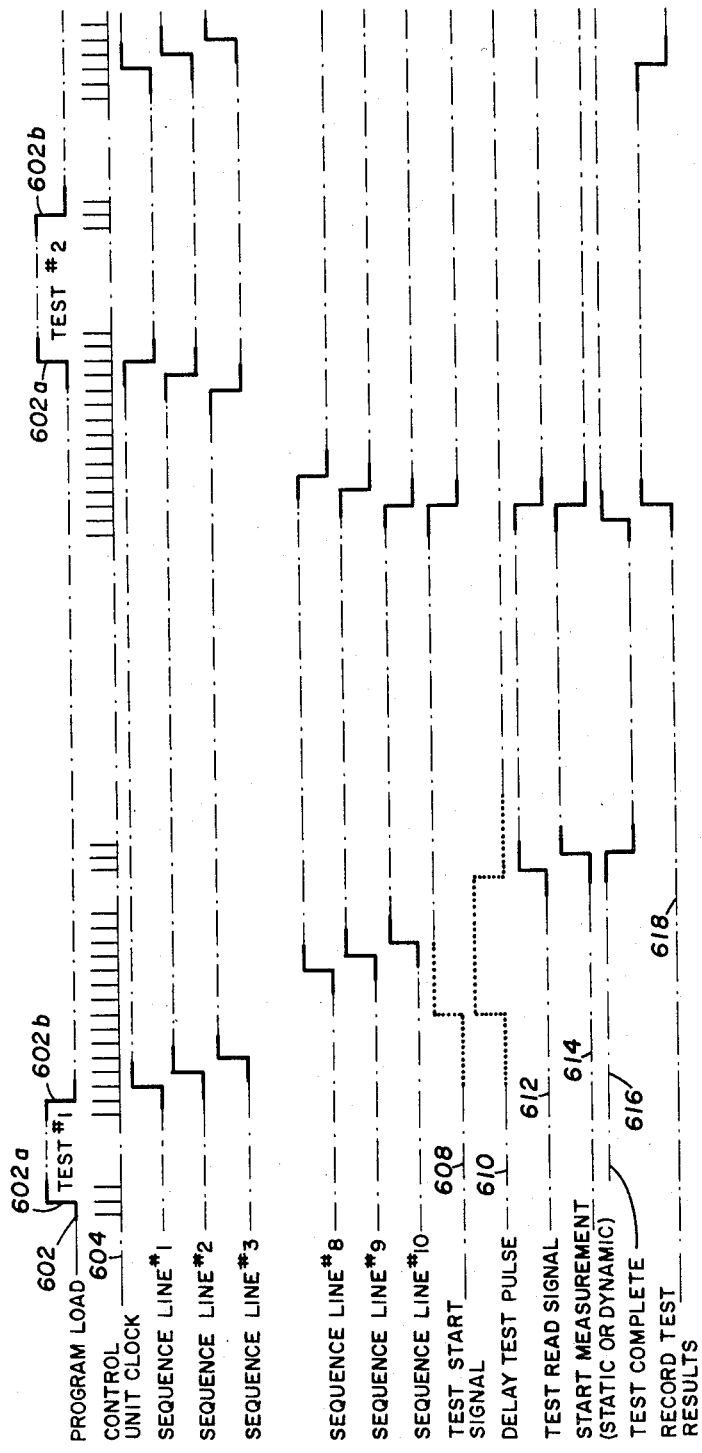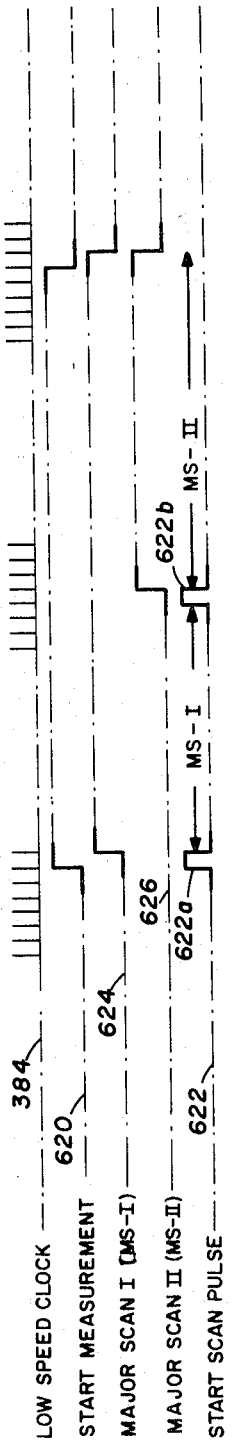
FIG. 8
FIG. 9

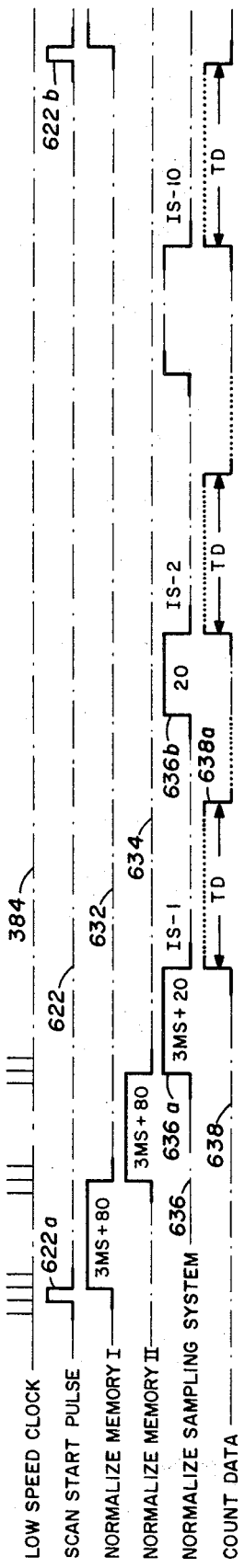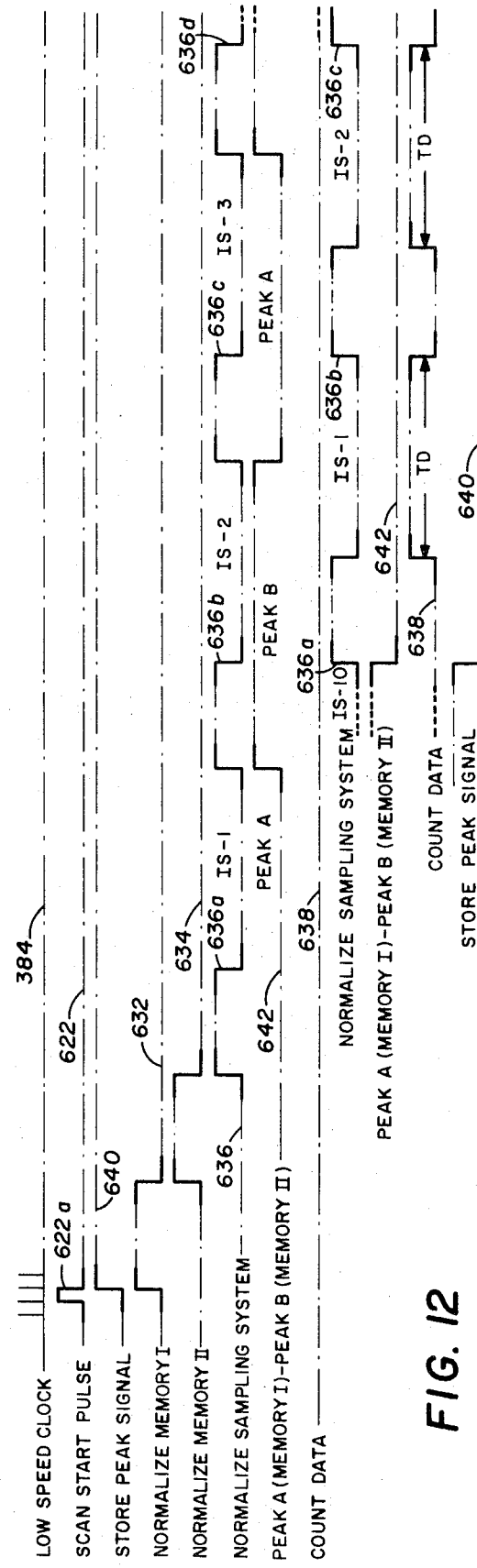
FIG. 11
FIG. 12

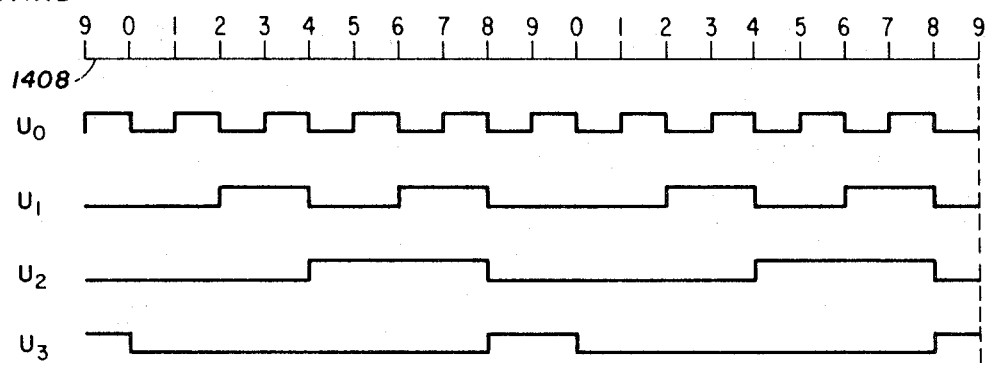
FIG. 14
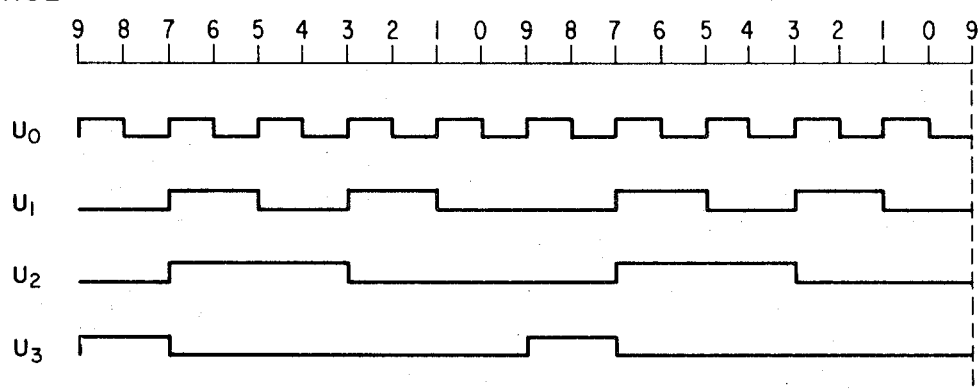
FIG. 15
FIG. 17
FIG. 18
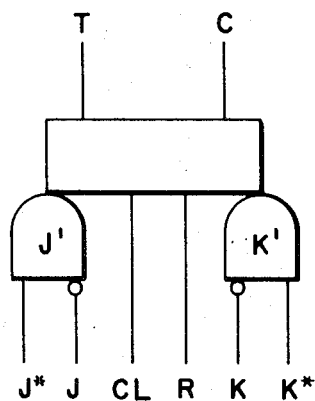
FIG. 16

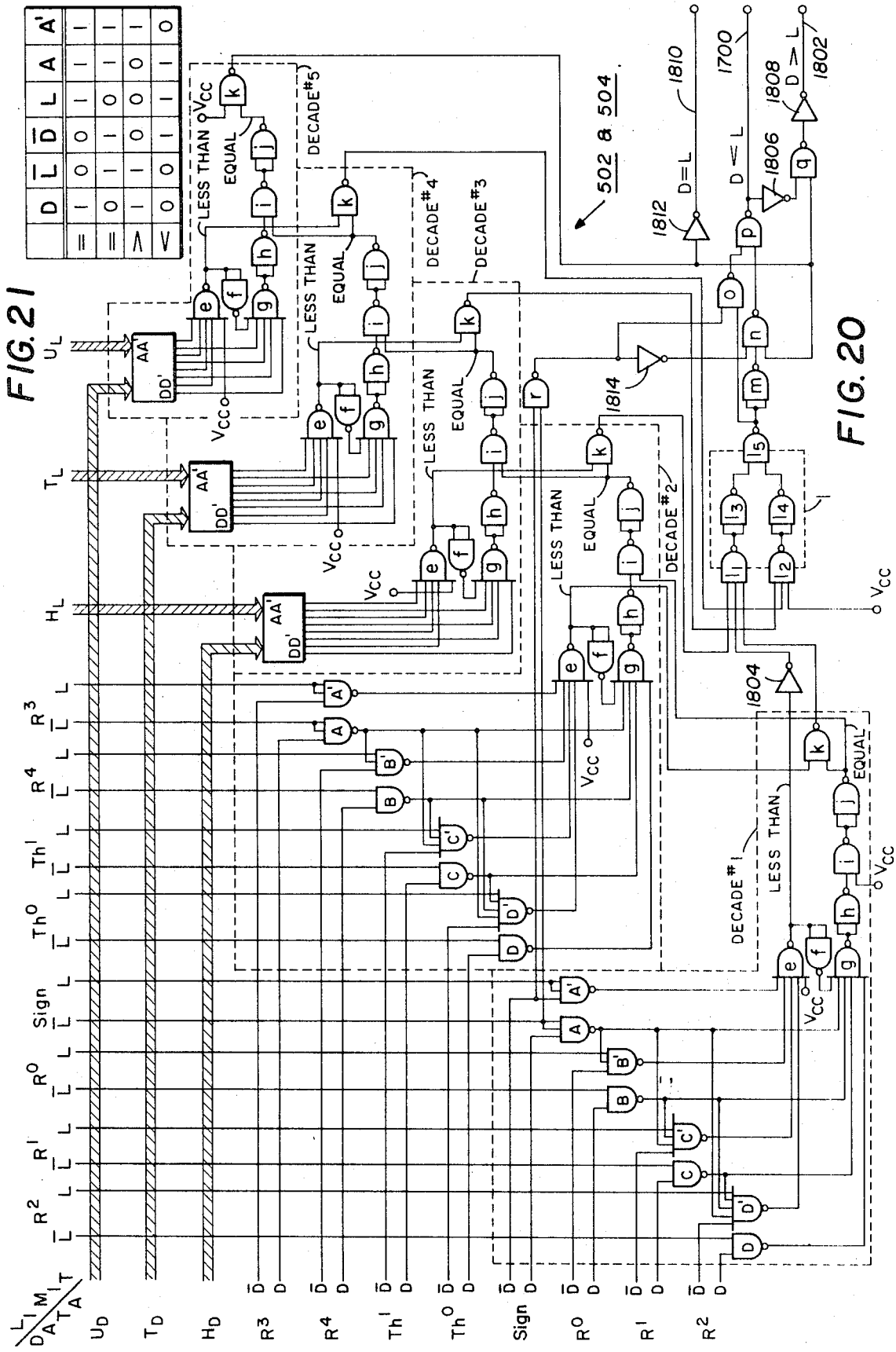

DATA READOUT SYSTEM

This invention relates generally to measuring and testing, and more particularly relates to a digital data readout system for an electronic measuring system or the like.

During and after the manufacture of electronic components such as diodes, transistors and integrated circuits, it is common practice for either or both the supplier and the ultimate user to make various tests in order to determine the operability and characteristic parameters of the devices. For example, various parameter tests must be made on discrete semiconductor devices so that the devices can be classified for particular uses in circuits designed by mathematical formulas. On the other hand, the parameter information of each component is virtually unobtainable in integrated circuits where a large number of components are formed "in situ" on a single semiconductor wafer, and even if obtainable, would be of comparatively little value. This necessitates testing the entire integrated network in order to obtain the necessary design parameters and to test the operability of the network.

All tests performed on semiconductor devices can be broken down into two broad categories. The first category, generally referred to as "static" testing, involves the application of stimuli and measurement of responses which are completely or essentially DC in nature and do not take into consideration either time or frequency ratings of the device under test. The other, referred to as "dynamic" testing, involves the application of both DC bias and a pulse stimuli which periodically varies to closely approximate the conditions under which the device will operate and the measurement of the responses from the stimuli. For example, the propagation delays of integrated logic circuits specified for 10 megacycle operation should be measured at a 10 megacycle repetition rate to properly consider R–L–C time constants and stored charge effects in the active devices.

Both component and integrated circuit testing has heretofore centered primarily around static measurements. Dynamic measurements have been made only in certain selected areas using specially designed test equipment. Comprehensive testing of integrated circuit devices is greatly complicated in that such devices may have a large number of leads, 14 to 20 being a very common number based on current technology. Further, a typical integrated circuit may require 25, 50, or more, separate measurements or tests with each test perhaps being performed using different bias levels, amplitudes, and pulse widths applied to different leads. Because of the large number of tests which must be made on a large number of network devices, the test methods and systems heretofore available made comprehensive testing impractical.

In copending application Ser. No. 482,449, filed Aug. 25, 1965, by John H. Alford, et al., entitled UNIVERSAL ELECTRONIC TEST SYSTEM now U.S. Pat. No. 3,418,573, and continuation-in-part application Ser. No. 512,109, filed Dec. 7, 1965, now U.S. Pat. No. 3,423,677 by John H. Alford et al., a method and apparatus for comprehensive testing of nonlinear logic circuits, parameter testing of discrete components, and certain functional testing of analogue circuits is described. For example, the method and apparatus may be used to test such components and circuits as AND, OR, NAND, NOR, flip-flops, inverters, logic drivers, differential amplifiers, operational amplifiers, linear amplifiers, printed circuit logic cards, logic modules, diodes, transistors, and resistors. These devices may be tested for delay time, rise time, storage time, fall time, propagation delay, propagation difference, average delay, commutating time, feed-through, overshoot, undershoot, period, pulse width, peak amplitude, amplitude, logic levels, noise thresholds, set-reset sensitivity, balance, offset voltage, output level, DC gain, step response (band width), leakage, breakdown voltage, reverse recovery, droop, as well as the more conventional static voltage and current measurements.

This invention is concerned with a data readout system specially adapted for the system described in the above-referenced applications but in its broader aspects, equally useful in any system requiring digital data readout.

Accordingly, an important object of this invention is to provide a digital data readout for a system for making substantially all voltage, current and time measurements necessary to test and classify substantially any electronic device or circuit.

Still another very important object of the invention is to provide a data readout for a system for making successive measurements by a single measurement channel and comparing these measurements to provide a differential measurement.

Another object of the invention is to provide a readout system wherein a succession of current, voltage or time measurements may be automatically averaged to obtain more accurate results.

Yet another object of the invention is to provide a data readout for a system for making time measurements on one or two waveforms between any two points on either of the waveforms identifiable by a voltage level or a percent difference in two voltage levels.

Still another object is to provide a data readout for a system for making amplitude measurements between any two points on a waveform or on two waveforms identified by time, by a most positive peak or a most negative peak, or a reference voltage.

A further object of the invention is to provide a completely digital readout system for greater accuracy.

Still another object is to provide a readout for a system wherein measurements are derived by taking the difference between two different measurements both made with respect to the same unknown reference value.

Another object is to provide a system wherein all measurements are read out as digital values.

Still another object of the invention is to provide a means for classifying a device based on measurement data and programmed classification data.

A further object of the invention is to provide a readout system capable of selectively adding, subtracting or dividing.

Another object is to provide an asynchronous digital comparator for substantially instantaneously providing an indication of whether a data number is less than, equal to, or greater than a limit number.

Another object is to provide a readout system for handling data expressed in the form of a constant frequency pulse train and a variable count period representative of the data, or in the alternative, data expressed in frequency modulated pulse train and a reference count period of fixed duration.

Still another object of the invention is to provide a synchronous bidirectional counter.

A further object is to provide a counter wherein either positive or negative data may be stored, then added or subtracted to subsequent data.

Yet another object is to provide a means for automatically dividing a number of successive differential measurements to provide a direct readout of the average value.

These and other objects are accomplished by means of a bidirectional counter connected to count the pulses of the pulse train in the proper manner when enabled by a logic signal derived from a count signal. A comparator means is connected to the counter for comparing the data represented by the count of the counter with programmed limit data and producing a logic signal representative of the relative values of the data.

In accordance with one aspect of the invention, a bidirectional counter is operated by logic means in such a manner as to either algebraically add or subtract the data being counted and data previously counted and stored in the counter. Logic means is also provided for operating the data counter in such a manner as to divide by enabling the data counter only at preselected intervals, and the division capability includes the capability to consider remainders.

In accordance with another more specific aspect of the invention, the comparator means comprises a first comparator for comparing the data number with a maximum limit value and a second comparator for comparing the data number with a minimum limit value such that a data number may be classified between limits.

In accordance with another aspect of the invention, an asynchronous comparator means is provided for immediately producing a "less than," "equal to" or "greater than" decision. More specifically, one of these decisions is reached at each binary bit by producing the logic product of the true data value and the complement limit value for each bit, and the logic product of the complement data value and the true limit value of the bit. These two logic products are then definitive of the relative values of the data number and the limit number at the respective bits. Logic circuitry is provided for asynchronously, i.e., simultaneously, considering the bits of the binary numbers in ranking order and producing either "less than" or "greater than" decisions based upon the highest order bit at which such a decision is reached, and producing an "equal to" decision when all bits of the two numbers are equal.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 5A:
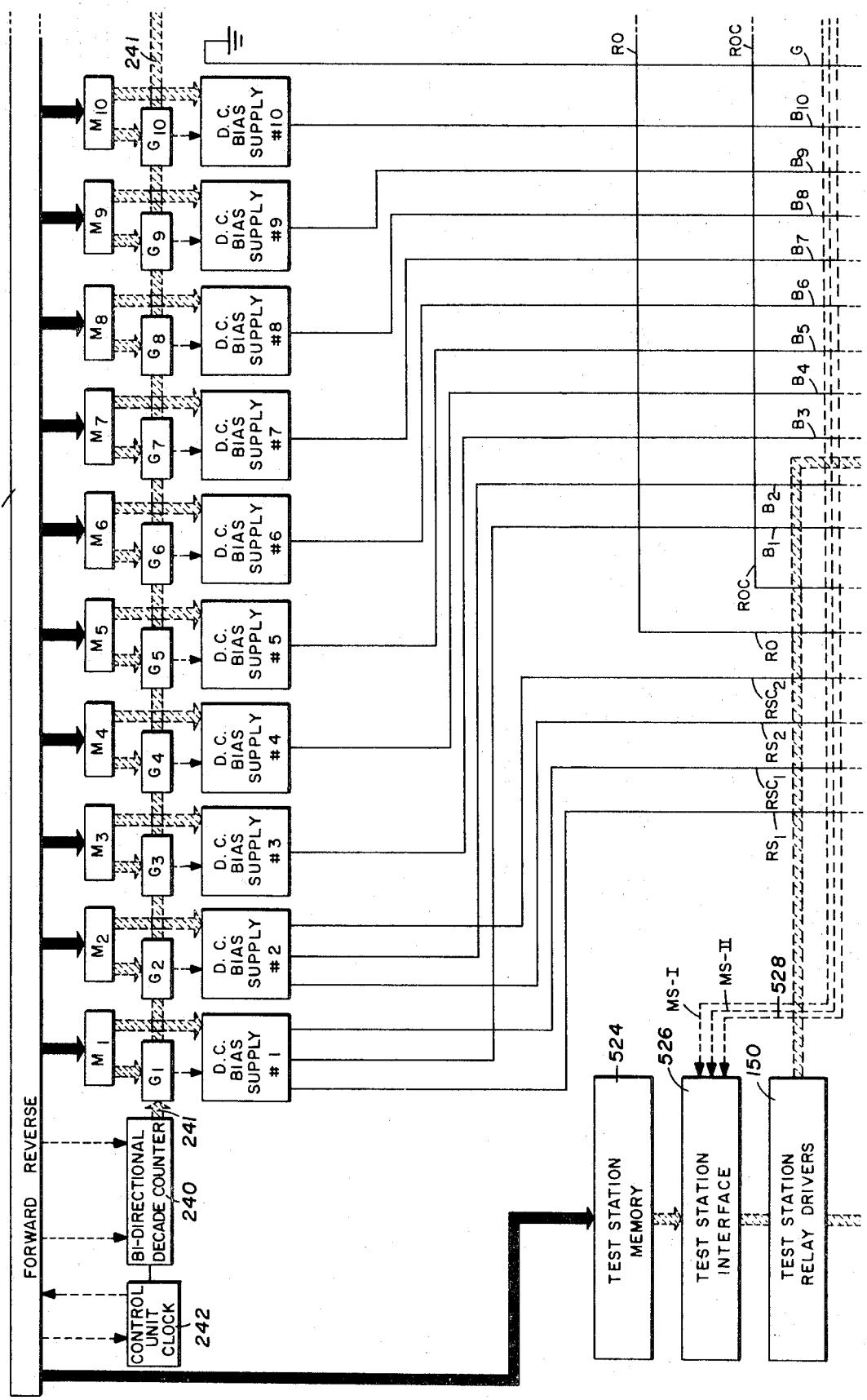
Figure 5B:
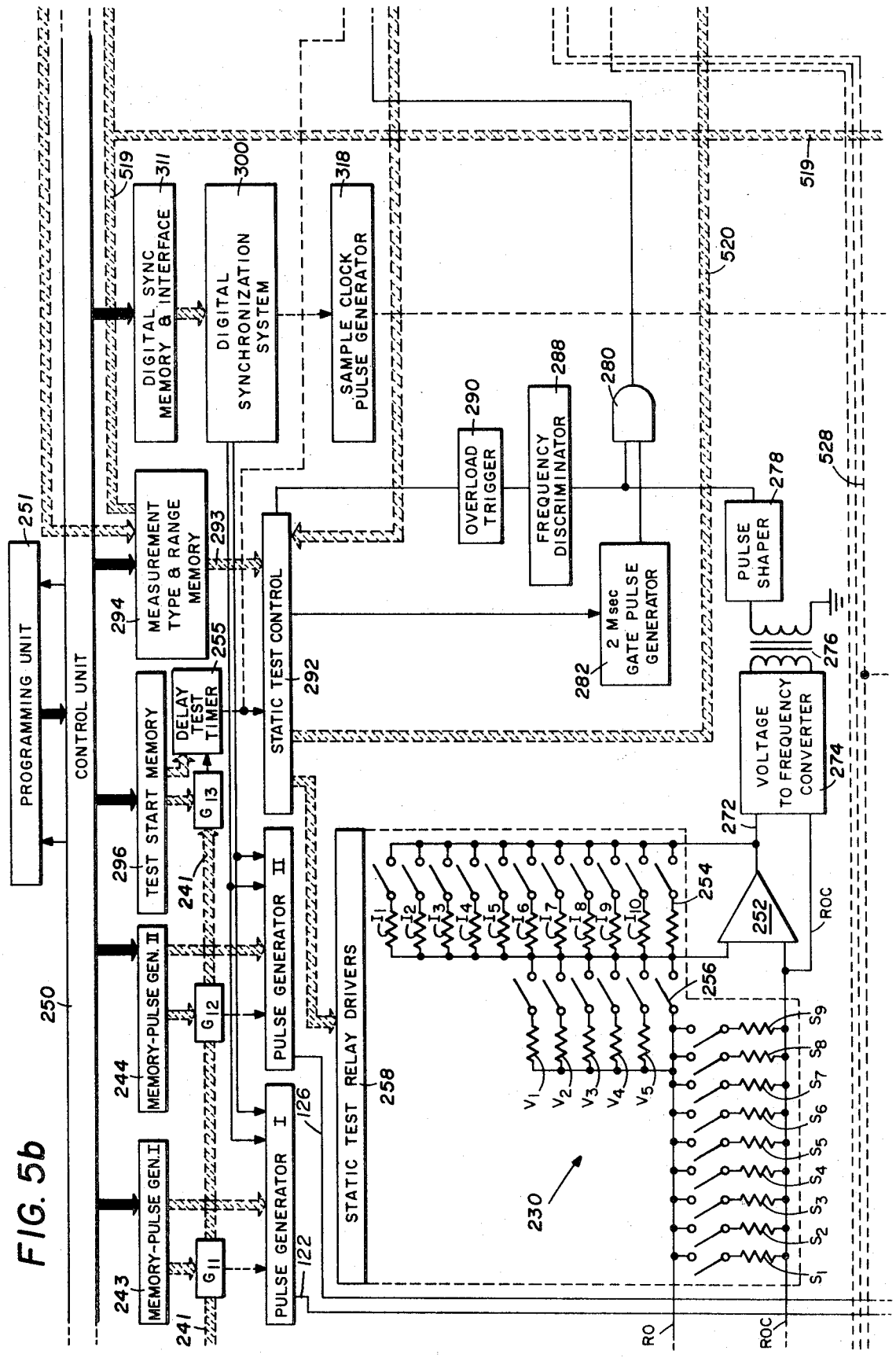
Figure 5C:
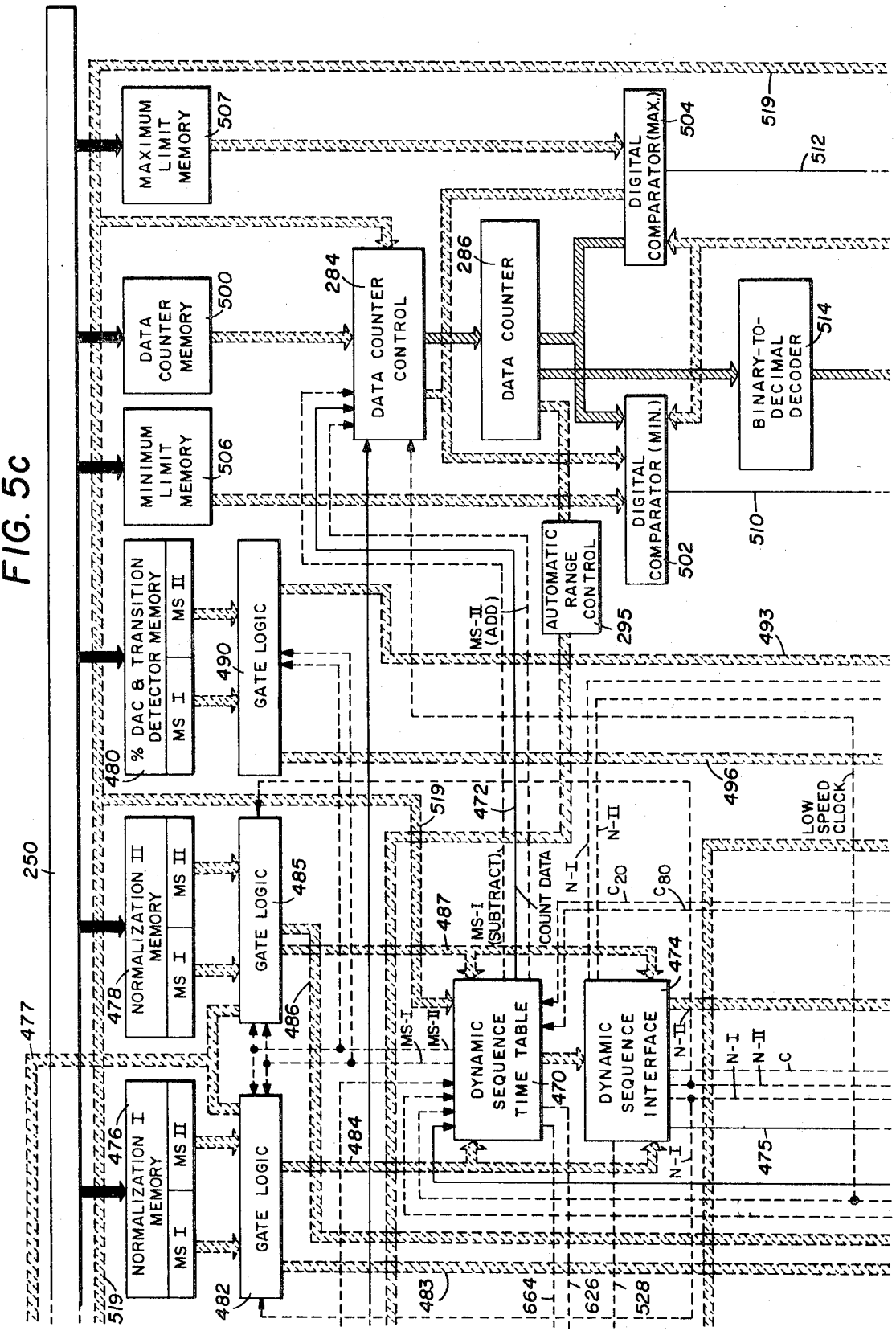
Figure 7:
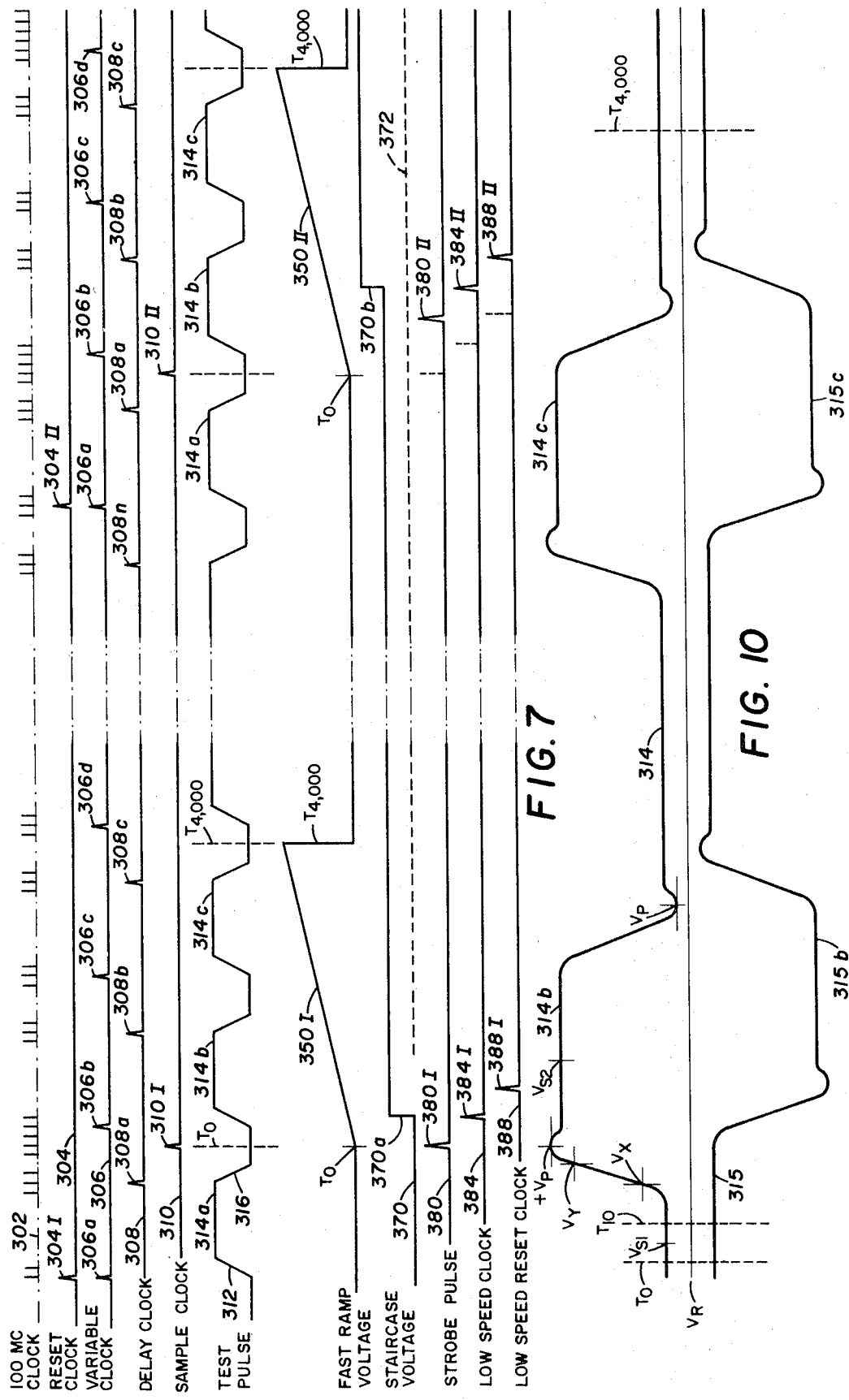
Figure 13:
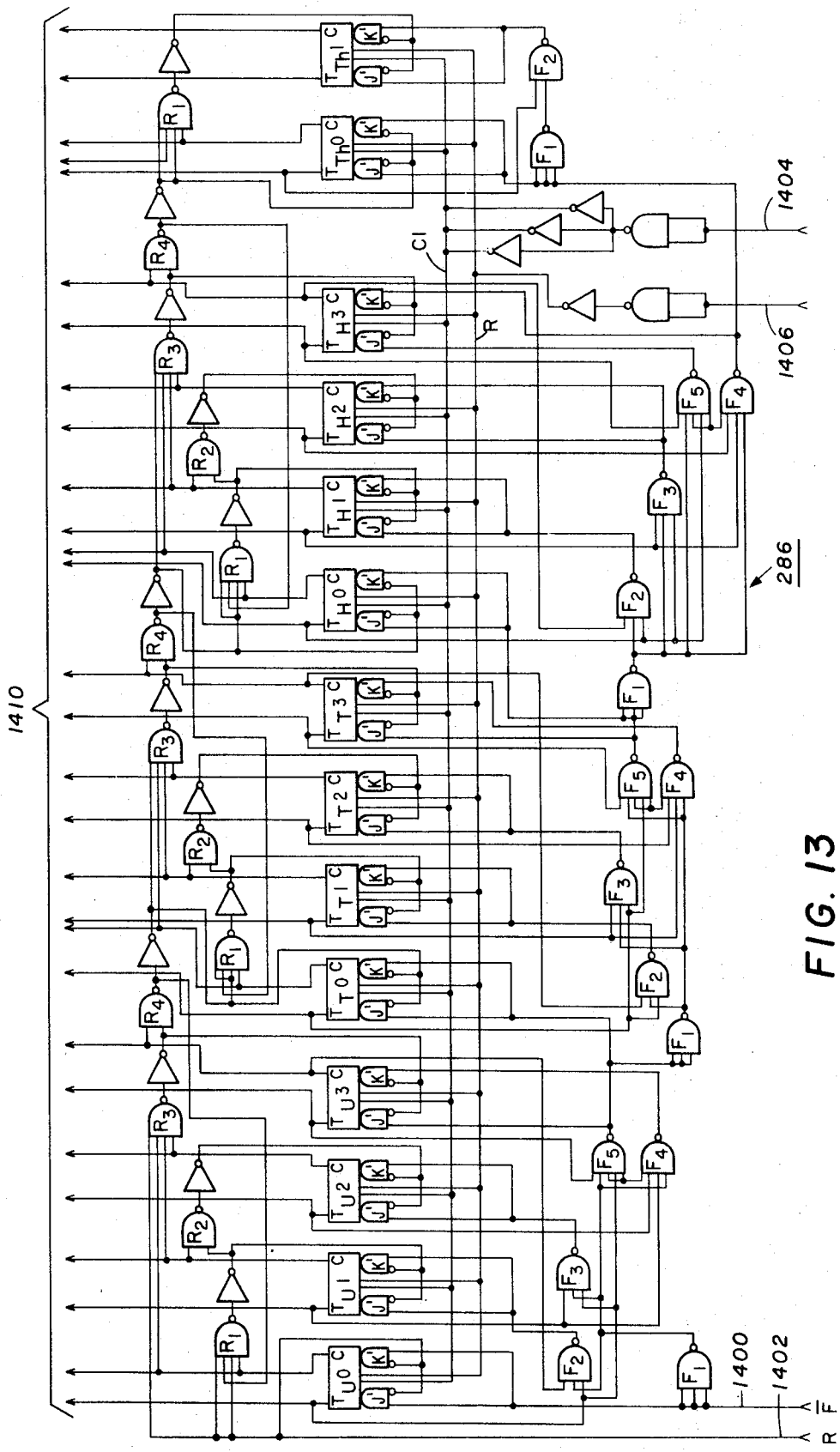
Figure 19:
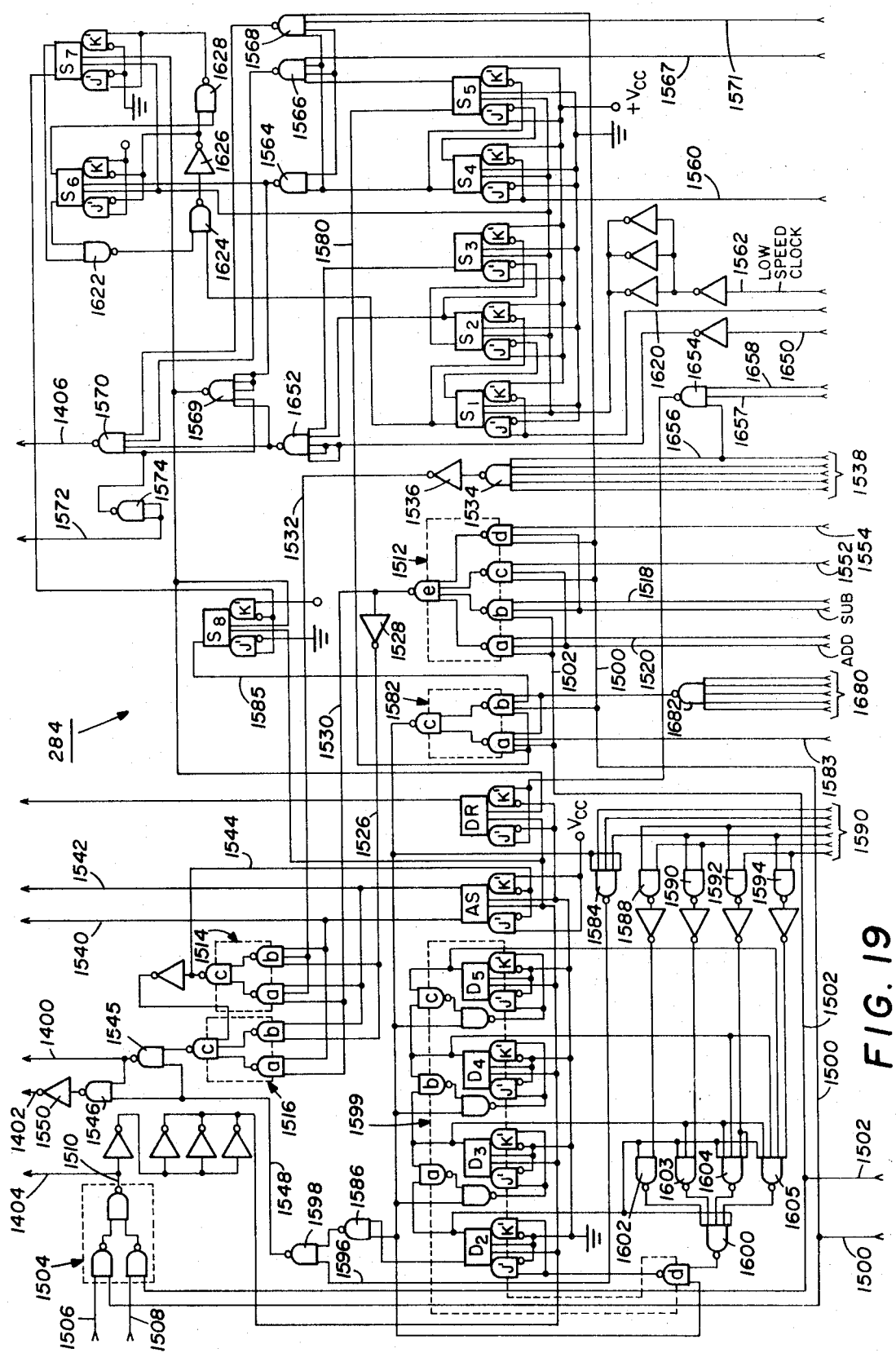

FIGS. 5a—5f are schematic block diagrams which collectively disclose the system of the present invention;

FIG. 6 is a schematic drawing illustrating the manner in which FIGS. 5a—5f should be arranged so that the lines extending between sheets will register and provide a composite diagram;

FIG. 7 is a timing diagram which illustrates the operation of the digital synchronization unit of the system and the derivation of the sample pulse and the low speed logic clock;

FIG. 8 is a timing diagram for the system of FIGS. 5a—5f;

FIG. 9 is a timing diagram illustrating the automatic sequence for a dynamic measurement;

FIG. 10 is a timing diagram illustrating a pair of typical repetitive waveforms which may be measured by the method and system of this invention;

FIG. 11 is a timing diagram which illustrates the automatic sequence during major scan I with other than peak storage;

FIG. 12 is a timing diagram which illustrates the automatic sequence during major scan with peak storage;

FIG. 13 is a schematic logic diagram of the data counter shown in FIG. 5c;

FIG. 14 is a timing diagram which serves to illustrate the function of the data counter when counting in the forward direction;

FIG. 15 is a timing diagram which serves to illustrate the operation of the data counter when counting in the reverse direction;

FIG. 16 is a symbolic representation of the J-K flip-flop used in the data readout system;

FIGS. 17 and 18 are truth tables for the J-K flip-flop of FIG. 16;

FIG. 19 is a schematic logic diagram of the data counter control shown in FIG. 5c as well as the actual gate pulse generator and gate shown in FIG. 5b;

FIG. 20 is a schematic logic diagram of one of the digital comparators shown in FIG. 5c; and FIG. 21 is a truth table which assists in understanding the operation of the digital comparator of FIG. 20.

Figure 1:
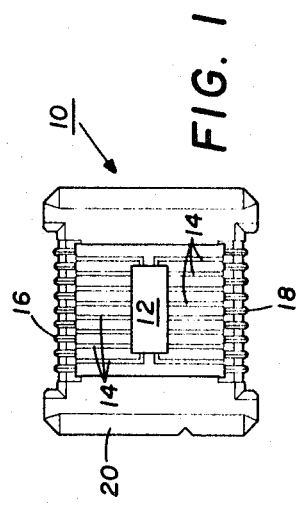
FIG. 1 is a plan view of a typical electronic device, mounted on a plastic carrier frame, of the type which may be tested by the system of the present invention.

Referring now to the drawings, a typical integrated circuit component which may be tested by the method and system of the present invention is indicated generally by the reference numeral 10 of FIG. 1. The device 10 is comprised of a flat package 12 in which the semiconductor wafer is located. Sixteen leads 14 extend from the flat pack and are crimped around the ribs 16 and 18 of a plastic frame 20 which facilitates handling, testing and shipment of the device. Although the device 10 is illustrated as having 16 leads, and the system illustrated has a capacity of handling only 16 leads for dynamic testing, it is to be understood that within the broader aspects of the invention a device having substantially any number of leads may be tested by proper modification of the test station and system.

TEST STATION SUBSYSTEM

The device 10 is received in a test socket 22 of a high frequency test station indicated generally by the reference numeral 25. The test station 25 is comprised of the socket board 24 and socket 22, a relay unit 26, and a performance board 28.

The test socket 22 has a number of leaf spring contacts 23 each of which engages and makes electrical contact with each of the device leads 14. The socket 22 is mounted on a printed circuit socket board 24 which is plugged into the relay unit 26 by connectors 30. Suitable printed circuits formed on the socket board 24 electrically connect the leaf spring contacts 23 and the respective connectors 30. The socket 22 and socket board 24 are specially designed for each different type of device being tested. To insure that the proper test socket is being used for a particular test, an identification code is formed by a printed circuit (represented schematically at 32) on the socket board 24 and this code is fed out through contacts 34, which are mounted on a plate 36, to a control unit which will hereafter be described.

The relay unit 26 (see FIG. 5d) has nine high frequency relays $R_1$ through $R_9$ for each of the 16 device leads $L_1$ through $L_{16}$. Thus the nine relays for lead $L_1$ are designated $L_1R_1$ through $L_1R_9$, etc. Each relay $L_nR_n$ is comprised of a glass encapsulated reed switch which is controlled by a coil wound around the glass capsule. The relays $L_nR_n$ are mounted in a circular housing 40 which is divided into four quadrants by radial partitions 41, 42, 43 and 44. Each quadrant, for example the quadrant between radial partitions 44 and 41, is divided into five segments by an insert 46 having radial partitions 47, 48, 49 and 50. Four upper printed circuit boards 60 overlay the top of each quadrant and four lower printed circuit boards 62 form the bottom of each quadrant. Each of the relays $L_nR_n$ is mounted between the upper and lower printed circuit boards with the relays structurally interconnecting the boards. This construction permits each of the segments to be merely dropped into the quarter segments of the circular housing 40 and hang suspended from the upper boards 60. The lead wire extending from the lower end of each of the relays $L_nR_n$ protrudes through the respective lower printed circuit board 62 and into female connector 64 on a printed circuit adapter board 66. The adapter board 66 has leaf spring contacts 68 on its under surface which are electrically connected to the various female connectors 64 by printed circuits on the adapter board 66. The spring contacts 68 are conveniently arranged in two concentric circles.

The circular housing 40 is keyed to into a ring 74, and the adapter board 66 is connected to the ring 74 by pr peripherally spaced screws 76 and standoffs 78. The entire relay unit 26 is received in an opening 80 cut in a tabletop 82 and is suspended from the upper plate 36 by screws 70 which extend through the ring 74 and standoffs 72 and are connected to a plate 36. The plate 36 rests on the tabletop around the periphery of the opening 80.

The performance board 28 has a large number of button contacts 86 which are arranged in two concentric circles and spaced to engage the spring contacts 68 on the lower surface of the adapter board 66. As will hereafter be described in greater detail, the performance board 28 is customized for each different type device 10 being tested and accordingly is made easily removable. This is accomplished by resting the performance board 28 on a tray 90 having a peripheral lip 92 and pedestal supports 94, together with suitable aligning means (not illustrated). The tray 90 is supported by suitable camming means represented schematically at 96 which are carried by a drawer 98. The drawer has rollers 100 which ride on tracks 102 which are secured to the desk top 82 on other support means. When the camming means 96 are rotated, the tray 90 and performance board 28 are lowered from the adapter board 66 so that the drawer may be pulled out and the performance board replaced. The electrical connections of the test station 25 are hereafter described in connection with FIG. 5d.

Figure 5D:
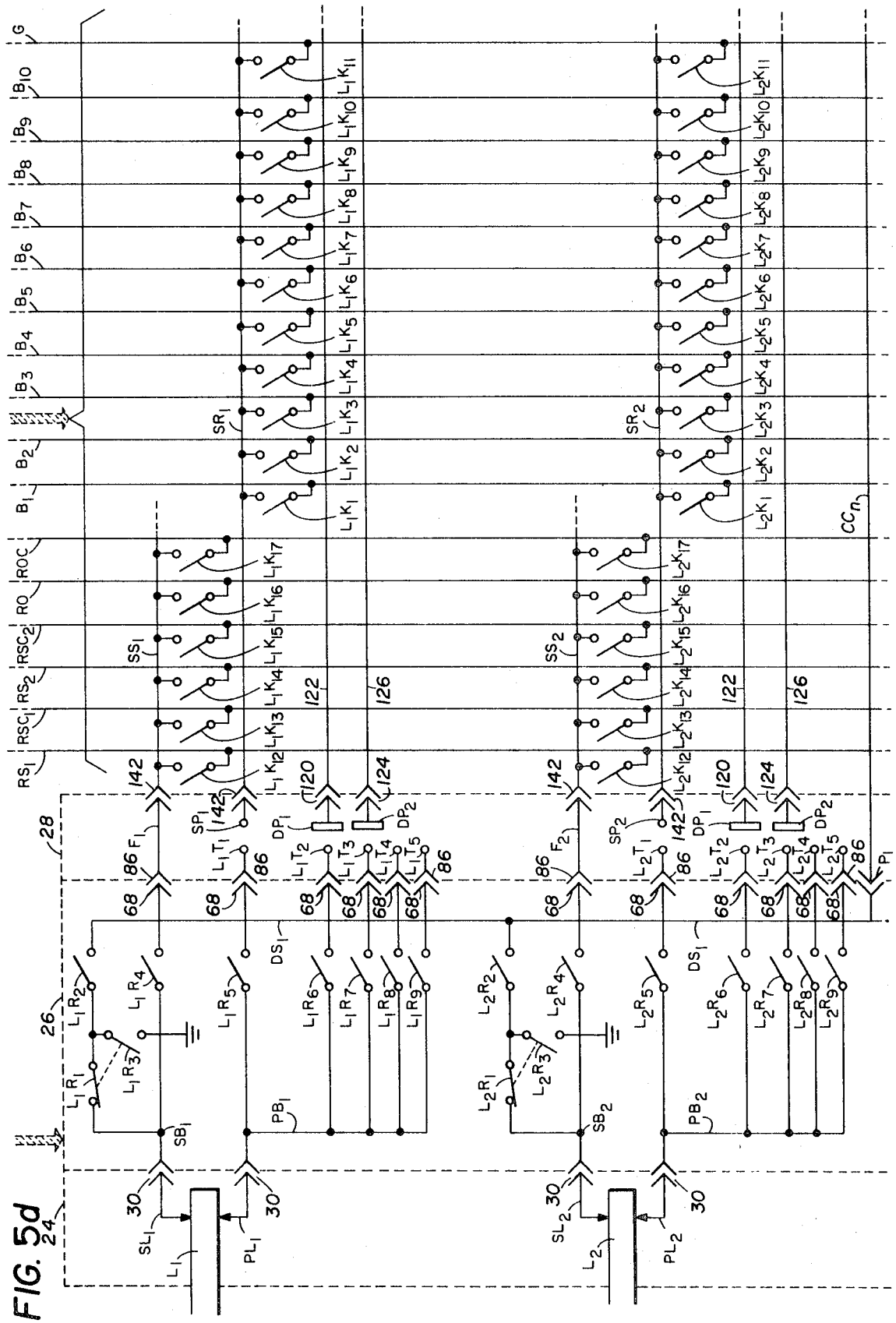
Figure 5E:
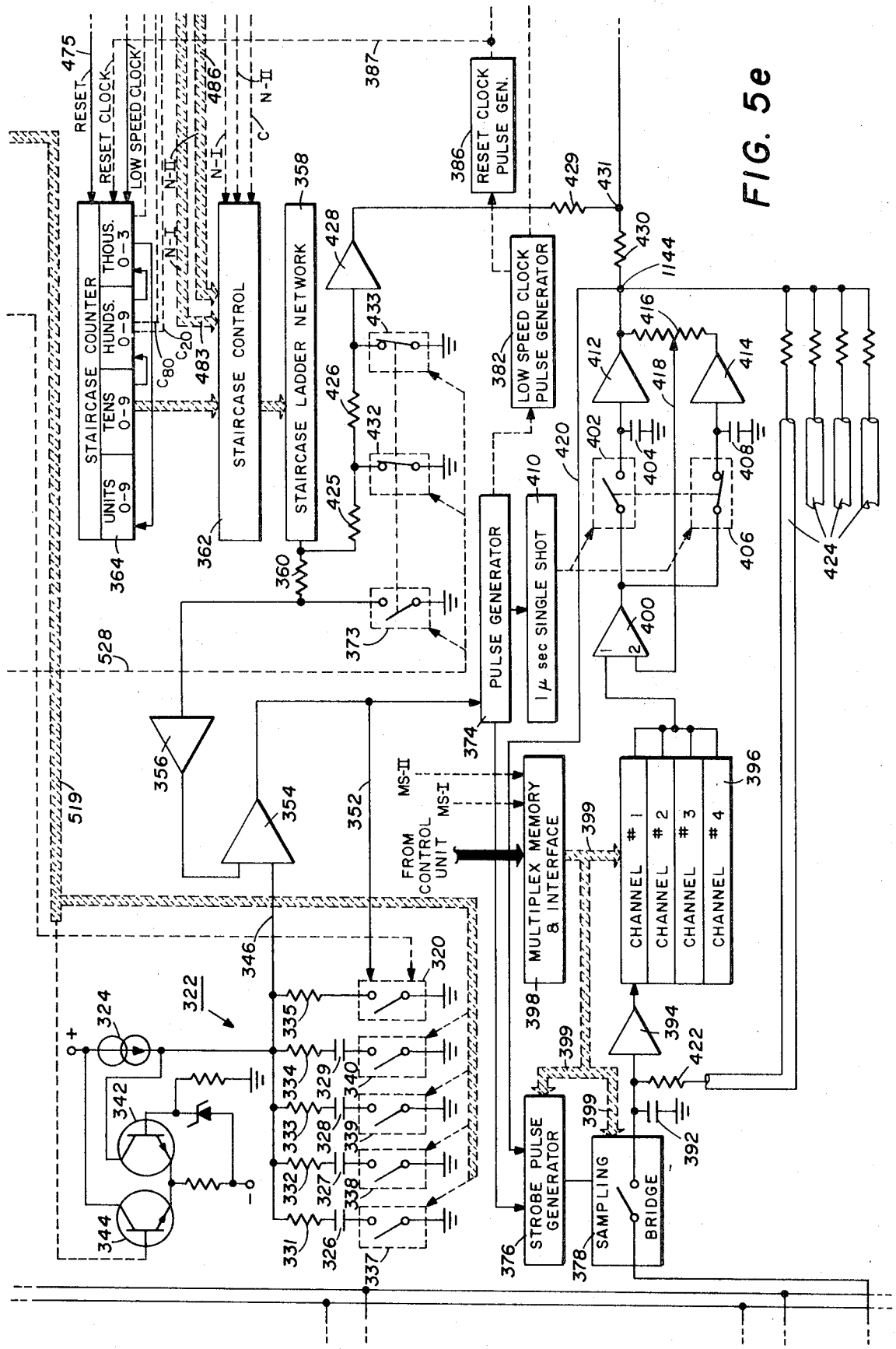

Referring now to FIGS. 5a—5f, and in particular to FIG. 5d, two leads of the device under test are illustrated schematically and designated by the reference characters $L_1$ and $L_2$. It should be noted that the device leads $L_3$—$L_{16}$, as well as the components associated with device leads $L_3$—$L_{16}$, are not illustrated in FIG. 5d, but are mentioned merely to assist in understanding the test station. The socket board 24 has power leads $PL_1$—$PL_{16}$ which are electrically connected to the device leads $L_1$—$L_{16}$ and to power buses $PB_1$—$PB_{16}$ on the upper printed circuit board 60 by the connectors 30. The power buses $PB_1$—$PB_{16}$ are connected through relays $L_nR_5$—$L_nR_9$ to the leaf spring contacts 68 on the adapter board 66. The buttons 86 on the performance board 28 which mate with the contacts 68 are connected to power terminals $L_nT_1$—$L_nT_5$.

Figure 4:
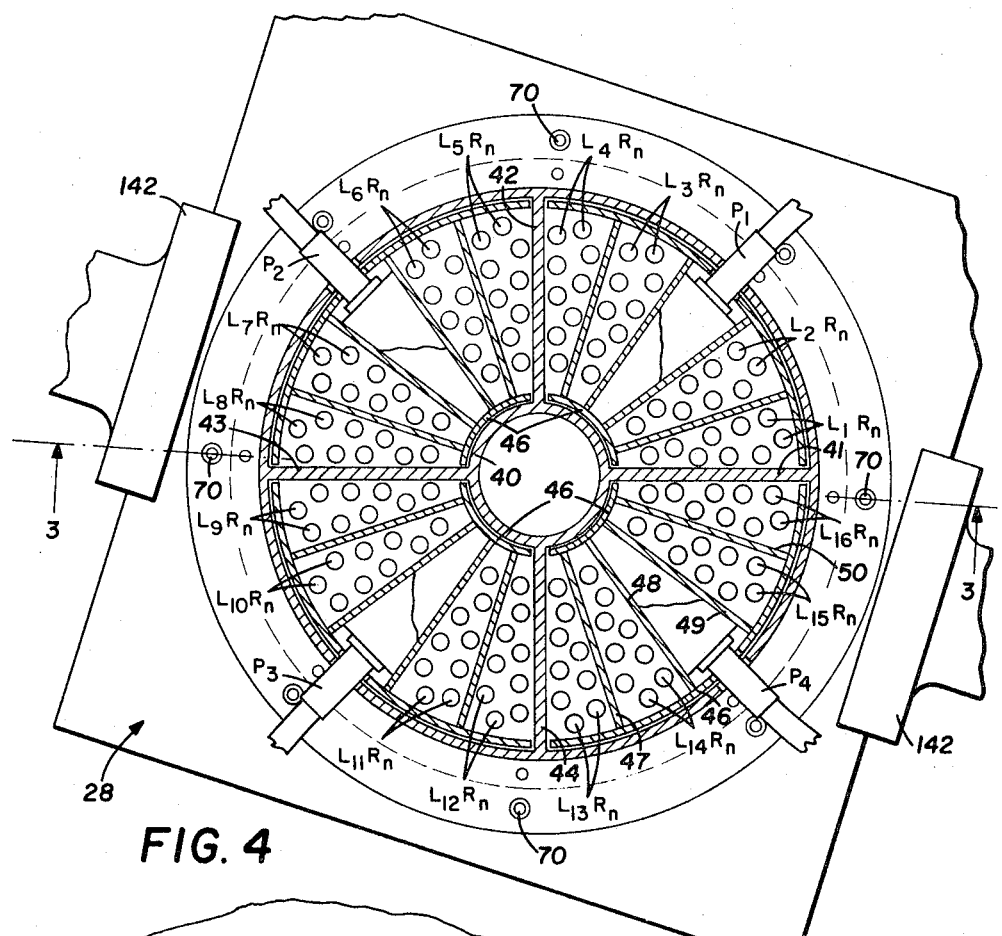
FIG. 4 is a somewhat schematic sectional view taken substantially on lines 4–4 of FIG. 3.

Kelvin type sense leads $SL_1$—$SL_{16}$ on the socket board 24 are each connected by one of the connectors 30 to sense buses $SB_1$—$SB_6$. DC sensing measurements are made through relay $L_1R_4$, and the conductor comprised of a spring contact 68 and button contact 86 on the performance board 28. In most cases, a direct feedthrough conductor $F_1$—$F_{16}$ will be formed on the performance board to connect the button 86 to a connector 142 presently to be described, and finally to a static sense bus $SS_n$ for each lead. Dynamic sensing is provided through relays $L_nR_1$ and $L_nR_2$ to dynamic sense buses $DS_1$—$DS_4$, each of which may be conveniently located on either the upper or lower printed circuit boards 60 or 62 of each quadrant to interconnect the four relays $L_nR_2$ in that quadrant. For example, relays $L_1R_2$—$L_4R_2$ would be connected to dynamic sense bus $DS_1$. Similarly, the groups of relays $L_5R_2$—$L_8R_2$, $L_9R_2$—$L_{12}R_2$, and $L_{13}R_2$—$L_{16}R_2$ would be connected to dynamic sense buses $DS_2$, $DS_3$ and $DS_4$, respectively, which are not illustrated. Four bayonet type probe connections $P_1$—$P_4$ are then connected to the dynamic sense buses $DS_1$—$DS_4$, respectively. The probe connections $P_1$—$P_4$ are physically passed through the wall of the circular housing 40 into a female receptacle disposed in the center segment of each of the four quadrants as can best be seen in FIG. 4.

Figure 3:
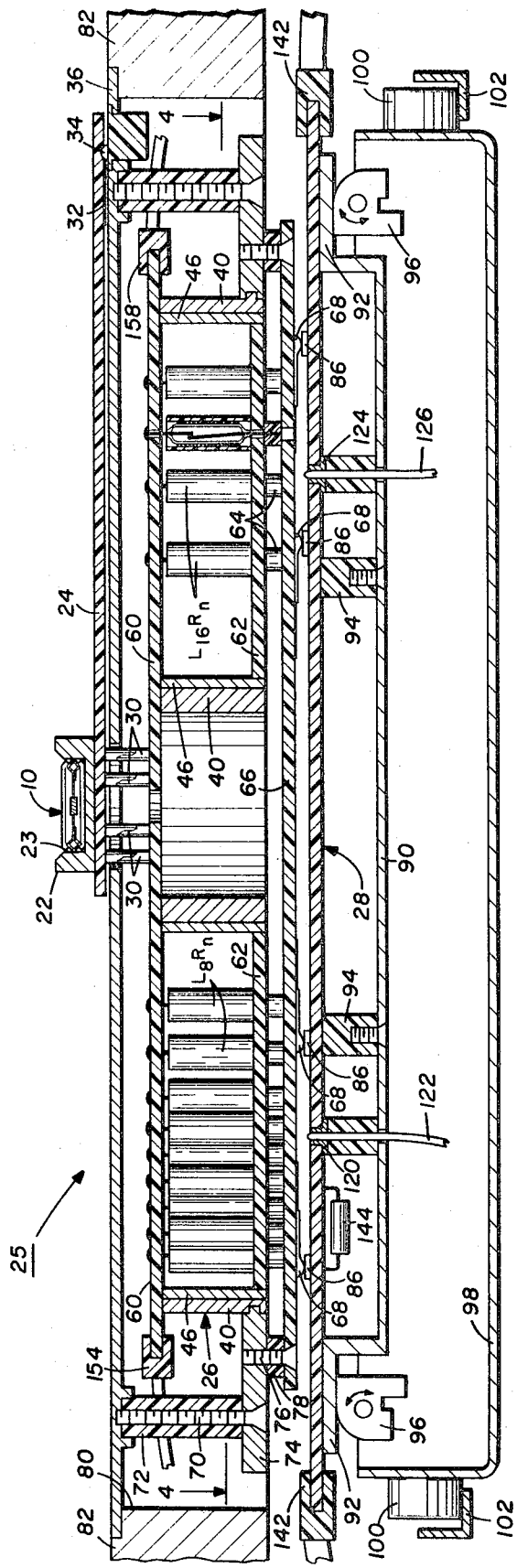
FIG. 3 is a somewhat schematic sectional view of the test station of FIG. 2 taken substantially on lines 3–3 of FIG. 4.

Static bias supply terminals $SP_1$—$SP_{16}$ are formed on the performance board 28 for leads $L_1$—$L_{16}$, respectively. The 16 straight through conductors $F_1$—$F_{16}$ are connected to static sense buses $SS_1$—$SS_{16}$ by multilead connectors 142 which may be seen at each edge of the performance boards board 28 in FIG. 3. A pair of dynamic stimuli buses $DP_1$ and $DP_2$ are provided on the performance board 28 and made available for connection to any one of the terminals $L_nT_1$—$L_nT_5$ at any one of the leads $L_1$—$L_{16}$ by means which will presently be described. The dynamic stimulus buses $DP_1$ and $DP_2$ on the performance board 28 may be circular in form and the terminals $L_nT_n$ arranged in a circle to facilitate connecting any of the terminals $L_nT_1$—$L_nT_5$ to either of the buses $DP_1$ or $DP_2$ by a jumper wire or load device as hereafter described. Bus $DP_1$ may be connected by a small connector 120 shown in FIG. 3 to a coaxial supply cable 122, and bus $DP_2$ may be connected by a like connector 124 to coaxial supply cable 126. The function of the performance board 28 can best be understood after a description of the static power supplies and the dynamic pulse generators used to stimulate the device under test which will presently be described.

Figure 2:
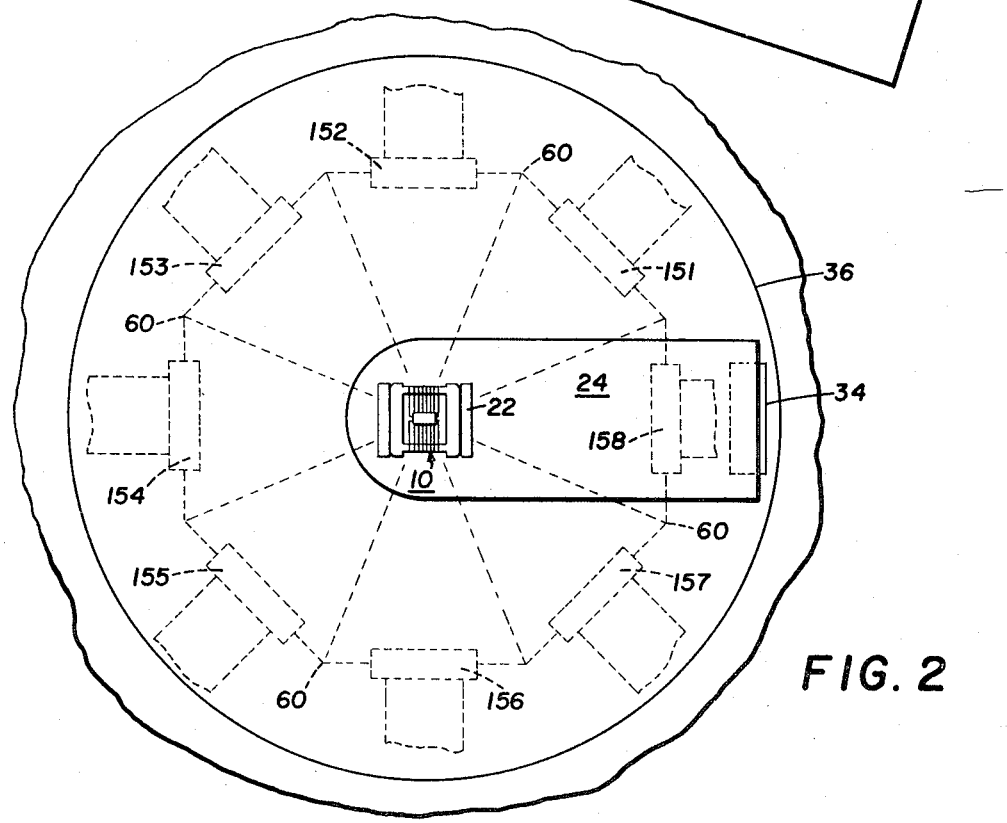
FIG. 2 is a plan view of the test station of the system of this invention.

Relays $L_nR_n$ are operated by current from a bank of controllable relay drivers 150. The leads from the drivers are coupled to the upper printed circuit board 60 by connectors 151—158 (see FIGS. 2 and 3). Each of the connectors 151—158 carrier carries the conductors extending to the coils of the relays associated with the two device leads. For example, the connector 151 carries the relay driver leads to the coils of relays $L_1R_1$—$AL_1R_9$ and relays $L_2R_1$—$L_2R_9$.

Ten DC bias supplies 01—010 are connected to supply buses $B_1$—$B_{10}$, respectively. Each of the DC bias supplies is programmable over a wide range with respect to both voltage and current, and when operating in the voltage mode has an automatic current limiting feature. These bias supplies are commercially available items. Each of the 16 static relay buses $SR_1$—$SR_6$ may be selectively connected to any one of the buses $B_1$—$B_{10}$ by the bank of relays $L_nK_1$—$L_nK_{10}$ or to a ground bus G by relays $L_nK_{11}$ provided for each device lead. DC bias supplies 01 and 02 have remote sense lines $RS_1$ and $RS_2$, and remote sense common lines $RSC_1$ and $RSC_2$ each of which may be selectively connected to any of the static sense buses $SS_1$—$SS_{16}$ by relays $L_nK_{12}$, $L_nK_{14}$, $L_nK_{13}$ and $L_nK_{15}$, respectively. The two remote sense leads for each of these bias supplies permit the sensing of either positive or negative voltages for reference purposes in the supplies. A pair of readout lines RO and ROC may also be individually connected to any one of the static sense lines by relays $L_nK_{16}$ and $L_nK_{17}$, respectively. The readout lines RO and ROC are the inputs to the static measurement subsystem 230 which will hereafter be described in greater detail. The coaxial cables 122 and 126 are connected to pulse generators I and II shown in FIG. 5b which produce pulse stimuli of a selected frequency, amplitude and width as hereafter described in greater detail.

The function of the performance board 28 will now be described. In a sequence of measurements or tests for a multilead device, it will often be necessary to apply DC bias levels to one or more of the device leads $L_1$—$L_{16}$ and to apply a pulse stimulus to others of the device leads. During a sequence of perhaps 25 tests to be performed on a single device, these bias levels and pulse stimuli will usually change in character and will usually be applied to different leads. In order to more nearly simulate the actual operating conditions, it will usually be necessary to connect some type of load in the bias or pulse stimulus circuit of the device, and the load value and character will often vary from test to test on a given device, and will nearly always vary for devices of different types. For this reason, the relay terminals $L_nT_2$—$L_nT_5$ and the static power terminals $SP_1$—$SP_{16}$ and dynamic power terminals $DP_1$ and $DP_2$ are oriented on the printed circuit board in close proximity. This provides great flexibility in that any terminal $L_nT_1$—$L_nT_5$ of each lead can be connected to any one of the supply buses $SP_1$, $DP_1$ or $DP_2$ either directly by a jumper wire or through an electronic component of the proper type and value, such as a resistor (indicated by the reference numeral 144 in FIG. 3), a capacitor or a resistor-capacitor network. This permits any device lead $L_n$ to be connected to any one of the ten DC bias supplies by connecting one of the terminals $L_nT_1$—$L_nT_5$ to the adjacent bus $SP_n$ and closing the corresponding switch $L_nK_n$. Then when the appropriate relay $L_nR_5$—$L_nR_9$ is closed during the proper test period, the lead will be connected to the selected power supply. Similarly, any one of the leads $L_1$—$L_{16}$ may be connected to either of the pulse generators I or II by wiring one of the terminals $L_nT_1$—$L_nT_5$ to the appropriate bus $DP_1$ or $DP_2$. As mentioned, this wiring may include a suitable electronic component selected to provide the desired circuit load. Any lead $L_1$—$L_{16}$ may be connected to ground, through a load if desired, by connecting one of the terminals $L_nT_1$—$L_nT_5$ to the adjacent bus $SP_n$ and closing the proper switch $L_nK_{11}$. The presence of the five terminals $L_nT_1$—$L_nT_5$ and controlling relays $L_nR_5$—$L_nR_9$ permits any one lead to be connected to the same power bus $SP_1$, $DP_1$ or $DP_2$ by different load components for different tests. Up to 10 different DC bias leads may be used during any one time and any one bias supply may be connected to any number of device leads simultaneously. The provision of two pulse generators which are synchronously controlled as hereafter described permits the application of two related pulse trains to different terminals of the device.

Both static and dynamic sensing, as well as the remote sensing for DC bias supplies 01 and 02, are made through a Kelvin connection to the particular lead. Static measurements are made by closing relay $L_nR_4$ and opening relays $L_nR_2$ and $L_nR_3$ and closing the appropriate relay $L_nK_{16}$ or $L_nK_{17}$. Dynamic measurements are made by opening relay $L_nR_4$ and closing relays $L_nR_1$ and $L_nR_2$. The probes are grounded during the storage of a reference voltage in the dynamic measuring subsystem as will hereafter be described by opening relay $L_nR_1$ and closing relays $L_nR_2$ and $L_nR_3$. It should be noted that relays $L_nR_1$ and $L_nR_3$ are always operated in the alternative as represented by the interconnecting dotted line.

The time at which le each of order DC bias supplies 01-—010 and the pulse generators I and II is activated may be programmed so that the bias voltages and pulse stimuli may be applied to the device under test in any desired sequence in order to protect the device. A bidirectional decade counter 240 sequentially energizes 10 successive sequence lines 241 on 10 successive pulses of the control unit clock 242. The 10 sequence lines 241 10, each of 13 gate logic circuits $G_1$—$G_{13}$. Shift register memories $M_1$ through $M_{10}$ store program information for the DC bias supplies 01—010, respectively. Each of the memories $M_1$—$M_{10}$ stores information concerning the type and level of bias to be supplied, whether the voltage is to be referenced based upon the voltage at the device lead or at the supply, the time at which the bias supply is to be activated, etc. Memories 243 and 244 store similar information for the pulse generators. An activate signal is gated to each respective bias supply and pulse generator by the respective gate logic systems $G_1$—$G_{12}$ when the logic level of the sequence line programmed for the particular supply or generator changes from 0 logic level to a 1 logic level.

SYSTEM OPERATING SEQUENCE

The operating sequence of the system may be best understood by reference to the timing diagram of FIG. 8. The entire system is operated by the control unit 250. One of the principal functions of the control unit 250 is to route the program information from the programming unit 251 to the various shift register memories of the system which have been or will be described. Operation of the control unit 250 is synchronized by the control unit clock 242, the output of which is indicated by the time line 604. After operation of the system is initiated from the control unit 250, all program information for test No. 1 is routed into and stored in the respective memories during the period starting at 602a and ending at 602b.

The programming unit 251 may be of any conventional type, such as magnetic, punched card, punched tape, or computer, so that a sequence of different tests, including major scans I and II for a dynamic measurement, or a static measurement, can be easily repeated for successive test devices. As mentioned, the control unit 250 starts and stops the program unit 251 and routes the information from the programming unit to the appropriate memory as a result of a coded address at the beginning of each set of program information to be put in a particular register. Since all memories are shift registers, the memory must be completely filled in order to place the information in the proper bits of the shift register. The programming unit is automatically stopped after each test has been programmed by a stop signal in the program. The use of addressable shift register memories saves a considerable amount of programming time because for each succeeding test, only the registers in which a test condition is to be changed need be reprogrammed.

After the programming has been completed, as indicated by a signal from the programming unit to the control unit, the bidirectional decade counter 240 is activated to count the control unit clock pulses 604 in the forward direction and sequentially bring the 10 sequence lines 01—010 (which are indicated collectively by the reference numeral 241 in FIG. 5a) up to a logic 1 level as indicated by the time lines in FIG. 8. As previously described, any one of the DC bias supplies 01—010 or the pulse generators I and II may be activated by a signal gated through the logic gate circuits $G_1$—$G_{12}$, respectively, by one of the sequence lines and a program line from the respective memories $M_1$—$M_{10}$, 243 and 244. In the same manner, any one of the 10 sequence lines together with a program line from a test start memory 296 may gate a test start signal represented by the time line 608 from the logic gate circuit $G_{13}$ to a delay test timer 255. The delay test timer produces a delay test pulse represented by the time line 610 upon receipt of the test start signal 608. The delay test pulse 610 continues for a time determined by program information from the test start memory 296 to permit the device under test to stabilize. After the delay test pulse 610, a test read signal represented by the time line 612 is sent to the static test control 292 and to the dynamic sequence timetable 470 which will hereafter be described. A start measurement signal 614 is then generated in both the static and dynamic measuring subsystems to initiate automatic operation of each of the subsystems in accordance with the program instructions.

Upon the completion of the static or dynamic measurement, a test complete signal 616 is sent back to the control unit 250 which generates a record test results signal 618, reverses the bidirectional counter 240, and starts rippling down the sequence lines 01—010 in reverse order, and also terminates the test start signal 608, terminates the test read signal 612, and terminates the start measurement signal 614. As soon as sequence line 01 has returned to 0 logic level, the program load signal 602 is sent to the programming unit 251 and the program information for test No. 2 is fed into the shift register memories. Upon completion of the programming for test No. 2 as indicated by the fall 602 of the program load signal, or the termination of the recordation of the data from test No. 1, as determined by the fall of the record test result signal 618, the sequence lines 01—010 are again rippled up and the second test proceeds in the same manner.

STATIC MEASUREMENT SUBSYSTEM

The readout lines RO and ROC are connected to the inputs of a static measuring subsystem indicated generally by the reference numeral 230. The subsystem includes a differential, operational amplifier 252 which is used to make both voltage and current measurements between the two lines RO and ROC. The readout common line ROC is always connected to one input of the amplifier 252. The readout line RO is connectable through one of five attenuating resistor-relay branches $V_1$—$V_5$ to make voltage measurements in different ranges, since the resistor values in the branches are different to provide different degrees of attenuation. A resistor-relay branch 254 is also closed to provide a feedback loop for the amplifier of a standard resistance value for all voltage measurements. For current measurements, one of nine resistor-relay branches $S_1$—$S_9$ is first closed across the input leads RO and ROC and the voltage drop across the branch measured by closing one of branches $V_1$—$V_5$, depending on the range, for a brief sample period during which the voltage drop across $S_1$—$S_9$ is sampled to determine whether or not the current to be measured is of such a magnitude as to drive the amplifier 252 into hard saturation. If not, the closed resistor-relay branch $S_n$, the closed branch $V_n$, and relay 254 are opened, and the relay 256 is closed and one of the resistor-relay branches $I_1$—$I_{10}$ is closed in the feedback loop of the amplifier 252 to provide a direct current measurement. The current measurement range is selected by the different values of the resistors in branches $I_1$—$I_{10}$. The resistance values of the branches $S_1$—$S_9$ correspond to the ranges produced by branches $I_1$—$I_9$, and branch $V_5$ alone corresponds to branch $I_{10}$ during the brief initial test period. All of the resistor-relay branches $V_1$—$V_5$, $I_1$—$I_{10}$, and $S_1$—$S_9$ and relays 254 and 256 are controlled by individual drivers in a relay driver bank indicated by the reference numeral 258.

The voltage differential between the output 272 and the common readout line ROC is applied to a voltage-to-frequency converter 274. The voltage-to-frequency converter is a commercially available item and produces a frequency proportional to the input voltage. The output of the converter 274 is coupled by a transformer 276 to a pulse shaper 278. As a result of the transformer coupling, the amplifier 252 and the converter 274 are free floating and thus measure the voltage between any to two leads of the device. The pulse shaper 278 converts the frequency to a pulse train which can be counted by a digital data counter. The digital counter is then enabled for 2 milliseconds, as will hereafter be described in greater detail. For purposes of the present description, however, it will be considered that the pulse from a 2 millisecond gate pulse generator 282 gates the pulse train from the pulse shaper 278 through an AND gate 280 to a data counter control 284 which gates the pulse train through to a data counter 286 during a static measurement. The gate pulse generator 282 is initiated by a 5 millisecond test read signal from a static test control 292.

The output from the pulse shaper 278 is also fed to a frequency discriminator 288 which is set to detect a frequency representative of about 250 percent of range. The output of the discriminator 288 fires an overload trigger 290 when the frequency exceeds the preselected level. The output of the overload trigger is fed to the static test control 292 which controls the operation of the relay driver 258. Upon receipt of an overload signal from the overload trigger, branches $V_1$—$V_5$ and relay 256 are immediately opened to prevent driving the amplifier 252 into hard saturation.

The static test control receives program instructions from the measurement type and range memory 294 which specify the type of static measurement, whether voltage or current, and the range.

The static measurement system also has an autorange capability as represented by the automatic range control 295. If the count of the data counter is either less than a predetermined minimum, such as 20 percent of range, or greater than a predetermined maximum, such as 199 percent of range, then a signal is fed back from the automatic range control 295 to the static test control to change the range to the next lower or next higher range and the measurement repeated. A static test is started on command from the delay test timer 255.

DYNAMIC MEASURING SUBSYSTEM

Synchronization for dynamic measurements is provided by a digital synchronization system 300. Referring to FIG. 7, the synchronization system 300 generates a high frequency reference clock, such as the 100 megacycle clock represented by time line 302, a reset clock represented by the time line 304, a variable clock represented by the time line 306, a delay clock represented by the time line 308, and a sample clock represented by the time line 310. The last 4 clock pulses all occur in precise synchronization with a pulse of the high frequency reference clock. The period between pulses 304I, 304II, etc., of the reset clock 304 may be selected by programming to occur after any number of reference clock pulses 302, such as from 1,000 reference clock pulses to 100,000 reference clock pulses. The reset period of the reset clock may conveniently be considered as a logic word having from 1,000 to 100,000 bits. The variable clock represented by the time line 306 may be programmed to occur a predetermined number of times within each reset period. The delay clock represented by the time line 308 may be programmed to occur at any selected number of reference clock pulses up to 100 after the occurrence of each variable clock pulse. The sample clock represented by the time line 310 may occur only once during each reset clock period, but may be programmed to occur in synchronism with any reference clock pulse within the period. The reset, variable, delay and sample clocks are programmed from a digital sync memory and interface 311.

The sample clock from the digital synchronization system 300 is applied to a sample clock pulse generator 318 which produces a pulse suitable for triggering the sampling system. The sample clock pulse opens a normally closed electronic switch 320 of a fast ramp generator indicated generally by the reference numeral 322. The fast ramp generator 322 is comprised generally of a current source 324 which is connected to charge one of four capacitors 326—329 through one of four resistors 331—334, depending upon which of four electronic switches 337—340 is closed in response to programmed range information. The capacitors may be selected to provide a fast ramp of different slope. Also, the current into the resistors and capacitors may be varied by turning a transistor 342 "on" which acts as a current source and shunts a portion of the current flow from the source 324 to ground. This is accomplished by reducing the potential at the base of a switching transistor 344 so as to lower the potential of the emitter of the transistor 342.

When the switch 320 is closed, as is normally the case, the output conductor 346 is at some low potential. However, when the switch 320 is opened by the pulse from the sample clock pulse generator 318, the voltage builds as one of the capacitors 326—329 is charged, depending upon which of the switches 337—340 is closed, to produce a linear fast ramp 350 as illustrated in FIG. 7.

The output 346 is connected to one input of a comparator amplifier 354. The other input to the amplifier 354 is connected to the output of a high input impedance amplifier 356. When the voltage of the output conductor 346 exceeds the voltage at the output of amplifier 356, the change in voltage at the output of amplifier 354 is fed back to conductor 352 to again close the switch 320 and quickly discharge the capacitor; thereby returning the voltage at the output 346 to its initial low level.

The amplifier 356 has an adjustable gain and adjustable offset for calibration purposes. The input to the amplifier 356 is derived from a staircase ladder network 358 through a resistor 360. The staircase ladder network provides a large number of selectable voltage levels in equal increments between two limits. For example, in the embodiment of the invention here being described, the staircase ladder provides 4,000 equal voltage increments between —2.0 volts and +2.0 volts. The staircase ladder network may be selectively set at any one of the voltage increments by a logic interface designated staircase control 362. The staircase control 362 essentially has two modes of operation, one being the reference mode during which any one of the 4,000 voltage levels is generated, and the other being the count mode. In the count mode, the staircase ladder network is successively stepped in cadence to the low speed logic clock, which is derived from the sample clock as is hereafter described, through equal increments as a result of the operation of a staircase counter 364.

The staircase counter 364 is comprised of a units, a tens, a hundreds and a thousands decade, although the thousands decade only counts from zero to three in order to provide 4,000 total counts. The counter 364 is connected by the staircase control 362 to step the staircase voltage one voltage unit for each count, a unit being 1 millivolt. However, for purposes which will hereafter be described in connection with the interlace scan, each low speed logic clock pulse increments the tens decade, rather than the units decade, and the tens decade overflows into the hundreds decade, which overflows into the thousands decade to produce a count of 400 (from 0-399). As a result, the staircase voltage is increased by an increment of 10 millivolts for each low speed clock pulse. Then the thousands decade overflows into the units decade and the 400 counts are repeated but each step is 1 millivolt greater than the corresponding step of the previous staircase produced by the preceeding 400 steps. The following table, based on a voltage range from —2.0 volts to +2.0 volts and 4,000 increments will serve to illustrate the output of the staircase ladder network when operated in the count mode for the 10 interlace scans IS-1 through IS-10.

STAIRCASE VOLTAGES IN COUNT MODE FOR INTERLACE SCANS

|  | IS–1 | IS–2 | IS–9 | IS–10 |
|---|---|---|---|---|
| Step 1 | −2.000 | −1.999 | −1.992 | −1.991 |
| Step 2 | −1.990 | −1.989 | −1.982 | −1.981 |
| Step 3 | −1.980 | −1.979 | −1.972 | −1.971 |
| Step k |  |  |  |  |
| Step 397 | +1.970 | +1.971 | +1.978 | +1.979 |
| Step 398 | +1.980 | +1.981 | +1.988 | +1.989 |
| Step 399 | +1.990 | +1.991 | +1.998 | +1.999 |

The staircase voltage at the output of the amplifier 356 is represented by the voltage time line 370 in FIG. 7, with the dotted line 372 representing the level at which no output is produced by the comparator 354. The DC offset voltage of the amplifier 356 is adjusted such that when the staircase ladder network is at the lowest voltage and the switch 320 is closed, no output is produced by the comparator 354. However, as soon as the fast ramp 350 exceeds the staircase voltage by an infinitesimal amount, an output is produced by the comparator 354 sufficient to trigger a pulse generator 374. The pulse generator 374 has tr three outputs, one of which drives a strobe pulse generator 376 which produces a strobe pulse, indicated by the time line 380 in FIG. 7, which is used to momentarily close a sampling bridge switch 378. Thus, the strobe pulses occur when the fast ramp voltage 350 exceeds the staircase voltage 370. When the staircase voltage is at the lowest level represented by the dotted line 372, the strobe pulse 380I occurs substantially in synchronism with the sample clock pulse 310I. But as the staircase voltage increases, strobe pulse 380II is delayed by a time interval equal to the time it takes for the fast ramp voltage to exceed the staircase voltage.

An output from the pulse generator 374 also drives the low speed clock pulse generator 382 which produces a pulse delayed a very short period of time behind the strobe pulse as indicated by the time line 384. The low speed clock 384 provides the cadence for the dynamic measuring system as will hereafter be described, and in particular operates the staircase counter 364 so that the voltage from the staircase ladder network is stepped up in synchronism with the low speed clock 384 as indicated at 370a and 370b. The low speed clock pulse generator 382 also drives a reset clock generator 386 which produces a low speed reset clock represented by the time line 388 and having successive pulses 388I and 388II. The low speed reset clock is used to reset the staircase counter 364 between any two successive low speed clock pulses as represented by the dotted line 387. This permits the use of the staircase counter for certain other control functions which will hereafter be described in greater detail.

As previously mentioned, the 16 leads $L_1$—$L_{16}$ may be selectively connected to one of the four probe connectors $P_1$—$P_4$ by closing the appropriate relays $L_nR_1$ and $L_nR_3$. The connectors $P_1$—$P_4$ are at the ends of cables $CC_1$—$CC_4$, respectively, which are connected to the inputs of sampling bridges 378a—378d, respectively. The four sampling bridges 378a—378d are each operated by separate strobe pulse generators 376a—376d, all of which are operated by the pulse generator 374.

When a sampling bridge 378 is closed by the pulses from the strobe pulse generator for a period on the order of a 0.5 nanosecond, the capacitor 392 assumes a charge between the existing voltage on the capacitor plus some percentage of the difference between the voltage at the particular lead $L_n$ and the existing voltage on the capacitor 392. The voltage on the capacitor 392 is passed through a unity voltage gain high input impedance amplifier 394 and the multiplex unit 396 to input 01 of a high gain, high input impedance comparator amplifier 400. As used herein, a high input impedance amplifier is meant to be an amplifier having a high input impedance as compared to its output impedance. The output from the amplifier 400 is connectable through a normally open electronic switch 402 to charge a capacitor 404, and is connectable through a normally closed electronic switch 406 to charge a capacitor 408. The normally open switch 402 is closed and the normally closed switch 406 opened in synchronism with the closing of the sampling bridge 378 for 1.0 microsecond by a 1.0 microsecond pulse from a single shot pulse generator 410 which is triggered by an output from the pulse generator 374. The voltage on the capacitor 404 is applied to the input of a high impedance, unity gain amplifier 412, and the voltage on the capacitor 408 is applied to the input of an identical amplifier 414. The outputs of the amplifiers 412 and 414 are interconnected by a variable voltage divider 416, the sliding contact of which is connected by conductor 418 to the second input of the comparator amplifier 400. The output of the amplifier 412 is also connected by a conductor 420 back to each of the strobe pulse generators so as to establish the proper reverse bias level for the sampling bridge, and is connected through resistors 422 and four coaxial cables 424 to charge the four input capacitors 392 for purposes which will presently be described in greater detail.

When one of the sampling bridges 378 is closed for a very short duration, for example about 0.5 nanosecond, some percentage of the difference in voltage at the device lead and the voltage stored on the capacitor 392 will be added to the capacitor 392, the percentage being defined as the sampling efficiency of the bridge. For example, if the charge on the capacitor 392 is 1.0 volts and 2.0 volts is present at the device lead, the voltage at the capacitor 392 would be 1.5 volts after the sampling bridge has momentarily closed and then opened, assuming a 50 percent sampling efficiency. The purpose of the sampling system just described is to produce a voltage at the output of the unity gain impedance amplifier 412 equal to the voltage at the input of the sampling bridge when the bridge is momentarily closed. This is accomplished as follows.

Simultaneously with the closing of the sampling bridge 378, the normally open switch 402 closes and the normally closed switch 406 opens, and this condition persists for approximately 1.0 microsecond. Assume that as the sampling bridge 378 is closed three times in succession, the voltage at the input of the bridge is a positive 1.0, 2.0 and 3.0 volts, respectively. Also assume for ease of illustration that the sampling efficiency of the bridge is 50 percent and that the initial voltage charge stored on each of the capacitors 392, 404 and 408 is 0.0 volt. After the sampling bridge 378 has closed momentarily, the capacitor 392 will be charged to 0.5 volt. The unity gain amplifier 394 applies the 0.5 volt to the first input of the high gain operational amplifier 400. Since the switch 402 is closed and the switch 406 is open, the capacitor 404 is quickly charged by the high output of the amplifier 400 because the initial feedback through conductor 418 to the second input of the amplifier 400 is 0.0 volt. The capacitor 404 is charged until the voltage at the output of the unity gain amplifier 412 is sufficient to raise the voltage at the second input of the amplifier 400 to 0.5 volt. Since the sliding contact on the variable resistor 416 is set at 50 percent, and since the charge on the capacitor 408 is 0.0 volt, the output voltage at the amplifier 412, and hence the charge on the capacitor 404, must reach 1.0 volt before the amplifier 400 is balanced and charging of the capacitor 404 ceases. This condition occurs during the period when the switch 402 is closed and the switch 406 is open. The time constant of resistor 422 and capacitor 392 is sufficiently long that the change in the voltage on capacitor 392 is of no consequence during the period while switch 402 is closed, and any such change appears as an increase in sampling efficiency of the sampling bridge and can be compensated by adjusting resistor 416.

After switch 402 opens and switch 406 closes, the capacitor 392 is charged up to 1.0 volt over a period of about 9.0 microseconds and the capacitor 408 follows the charging of capacitor 392 as a result of the imbalance at the inputs of amplifier 400 until the charge on all three capacitors 392, 404 and 408 is 1.0 volt, which was the presumed voltage at the device lead.

When the sampling bridge 378 next closes, the input voltage is assumed to be 2.0 volts. The voltage on the capacitor 392 is 1.0 volt due to the previous sample. When the sampling bridge again opens, the charge on the capacitor 392 will have been increased to 1.5 volts, or 50 percent of the level between the input voltage to the bridge and the voltage on the capacitor 392 before the sample, due to the 50 percent sampling efficiency presumed for the bridge. The 1.5 volts is passed through the unity gain amplifier 394 and the multiplexer 396 to the first input of the amplifier 400. Since 1.0 volt is fed back to the second input of the amplifier 400 by conductor 418, the capacitor 404 is first charged by the output until the feedback through the amplifier 412 and the voltage divider 416 rebalances the amplifier 400, because switch 402 is closed and switch 406 is open. In order for the voltage at the second input of the amplifier 400 to be 1.5 volts, the voltage at the output of the amplifier 412 must be 2.0 volts because the voltage at the output of the amplifier 414 is 1.0 volt and the voltage divider 416 is set at 50 percent. Thus, the 2.0 volts at the output of the amplifier 412 is the same as the 2.0 volts at the input to the sampling bridge. After switch 402 opens and switch 406 closes, the 2.0 volts at the output of amplifier 412 is again transferred through the coaxial cable 424 and resistor 422 to charge the capacitor 392 and thus capacitor 408 to 2.0 volts so as to again balance the amplifier 400.

It should be noted that any DC offset voltage errors in the sampling system are ultimately stored on capacitor 408 and therefore no significant errors appear in the output of amplifier 412. Further, the high gain of the amplifier 400, which may be on the order of 20,000, makes any offset voltage errors in the switches 402 and 406 or in the amplifiers 412 and 414 negligible when compared to the measuring capabilities of the system. Thus, the output voltage from the amplifier 412 is always equal to the voltage at the input of the sampling bridge at the time the sampling bridge switch is closed.

When operating in the scan mode, the sampling system reproduces the waveform at the device lead by a stair step approximation, but at a much lower frequency. Assume that two successive reset clock pulses are represented at 304I and 304II. Then the first, second and third variable clock pulses 306a, 306b and 306c occur on predetermined 100 megacycle clock pulses after the occurrence of each reset clock pulse 304I and 304II. Assume also that the variable clock pulses 306a, 306b and 306c are used to initiate the rise of test pulses 314a, 314b and 314c and that the corresponding delay clock pulses 308a, 308b and 308c are used to initiate the fall of the test pulses. Each of the test pulses 314a, 314b and 314c is thus oriented in precise relationship to the preceding reset clock pulses 304I or 304II. Assume also that this train of test pulses appears as illustrated in FIG. 10 at an input lead of the device under test. A complementary waveform comprised of a pulse train represented by the time line 315, such as might be produced at an output lead of the device as a result of the input stimulus, is also illustrated, but this waveform will not now be discussed. Assume also that the sample clock pulses 310I and 310II are programmed to occur between the first and second test pulses 314a and 314b after each reset clock pulse, and that the fast ramp generator is set such that the fast ramp voltages 350I and 350II, which start at $T_0$ in synchronism with the sample clock pulses 310I and 310II, end after the fall of the third test pulse 314c. Since each sample clock pulse 310 occurs precisely the same number of 100 mc. clock pulses after each reset clock pulse 304, and since each successive variable clock pulse is also referenced to the preceding reset pulse, the point $T_0$ will occur at the same relative position with respect to the second and third test pulses 314b and 314c during each of the periods I, II, etc. defined by the reset clock pulses 304I and 304II. It will be appreciated that there may be several thousand variable clock pulses 306 between each two reset clock pulses 304, but only one sample clock pulse.

When operating in the scan mode, the staircase ladder network is operated in the count mode to produce a series of 10 staircase voltage ramps heretofore described. At time $T_0$, the output from the amplifier 356 will be at the reference potential and the strobe pulse will occur essentially at time $T_0$, the sampling bridge 378 will momentarily close, and the voltage at the output of a sampling system will be equal to the voltage of the sampled waveform 314 at time $T_0$. Just after the sample, the low speed logic clock 384 actuates the staircase counter which increases the staircase voltage by 10 millivolts as heretofore described. As a result, the second fast ramp pulse 350II does not exceed the staircase voltage until a point in time one four-hundredths of the time period of the fast ramp after $T_0$, or at time $T_{10}$, on the test pulses 314b and 314c following the second reset pulse 304II. Similarly, succeeding strobe pulses are each delayed by one four-hundredths of the ramp period so that samples are taken at $T_{20}$, $T_{30}$, etc. up to $T_{3990}$ on the pulses 314b and 314c occurring during successive reset clock periods. As a result, the waveform within the period $T_1$—$T_{4000}$ is reproduced at the output of amplifier 412, but at a much slower frequency equal to one four-hundredths of the frequency of the reset clock, which in turn is merely a fraction of the frequency of the variable clock and hence of the test pulse train 314. This scan constitutes interlace scan IS–1. During interlace scan IS–2, the procedure is repeated except that because each 10 millivolt stair step level of the staircase voltage is 1.0 millivolt higher than corresponding stair steps during IS–1, the samples are taken at times $T_1$, $T_{11}$, $T_{21}$, etc. During the third interlace scan, the samples are taken at times $T_2$, $T_{12}$, $T_{22}$, etc. until 10 interlace scans are completed for purposes which will hereafter be described in greater detail.

The sampling system may also be operated in such a manner as to repeatedly sample the test waveform 314 at any point between $T_0$ and $T_{4000}$ during each fast ramp voltage. Of course, since $T_0$ is variable to any 100 mc. clock pulse by programming the sample clock, the test waveform 314 may be sampled at any point. This is accomplished merely by programming the staircase ladder network 358 to continuously produce a static voltage at a level corresponding to the particular time $T_n$ of interest during the field-of-view defined by the fast ramp, i.e., $T_0$—$T_{4000}$. As a result, the successive strobe pulses 380 are generated at the same time during each reset period and all samples are taken at the same time $T_n$ on each of the sampled repetitive pulses of the test waveform.

Provision is also made to selectively transfer the voltage at the output of the staircase ladder network 358 to the output of the sampling system for reference purposes, which is referred to as the reference mode. This is true whether the staircase ladder network is operating in the count mode or steady state program mode. The output from the staircase ladder network 358 is connected through resistors 425 and 426 to the input of a high impedance, unity gain amplifier 428 which is connected through a pair of resistors 429 and 430 to the output of impedance amplifier 412. The resistors 429 and 430 form a voltage divider and the junction 431 is the output of the sampling system. A pair of electronic switches 432 and 433 are provided to isolate the staircase voltage from the amplifier 428 and hence from the output 431 by grounding the input of the amplifier 428 when closed. The switches 432 and 433 are operated complementary to the switch 373 and to the ground probe switches $L_nR_1$, $L_nR_2$ and $L_nR_3$.

When the system is operating in the sample mode, either for scanning or for sampling at a selected point in time, switches 432 and 433 are closed and switch 373 is open. However, when the system is operating in the reference mode, the switches 432 and 433 are open and the switch 373 is closed to ground the input to amplifier 356, and in addition all of the switches $L_nR_1$ at the test station are open and the switches $L_nR_2$ and $L_nR_3$ are closed to ground all dynamic sensing probes to insure that the inputs to the sampling bridges 378 will be at ground and that capacitors 404 and 408 will store a ground reference voltage. The staircase ladder network 358 may then be used to supply any of the 4,000 reference voltages between −2.000 volts and +2.000 volts to the output 431 for normalization, i.e., reference purposes, or may supply the 10 successive staircase voltages produced when operating in the count mode in order to measure amplitudes as will hereafter be described.

The output 431 of the sampling system is connected to input 01 of a comparator amplifier 434 of a reference and comparison system. The output of the amplifier 434 is connectable through a pair of switches 435 and 436 and diodes 438 and 440 to charge a capacitor memory M–II. The output of the amplifier 434 is also connectable by switches 444 and 446 through diodes 448 and 450 to charge a capacitor memory M–I. The voltage on the memory M–II is applied to the input of the high impedance, unity gain amplifier 454 and the output of the amplifier 454 is applied to the 100 percent terminal of a percent digital-to-analogue converter 456 which is a programmable voltage divider ladder network as will hereafter be described in detail. The voltage on the memory M–I is applied to the input of a high impedance, unity gain amplifier 458 and the output of the amplifier is applied to the 0 percent terminal of the DAC 456. The output 460 of the DAC 456 is connected to input 02 of the comparator amplifier 434. Thus if the percent DAC 456 is programmed at 0 percent, the voltage on memory M–I is applied to input 02 of the comparator amplifier 434. If 100 percent is programmed, the voltage stored on the memory M–II is applied to the input 02 of the comparator amplifier 434. Any percent between 0 percent and 100 percent can also be programmed in which case a voltage equal to the voltage stored on memory M–I plus the programmed percent of the difference between the voltage stored on memory M–II and the voltage stored on memory M–I will be applied to the second input of the comparator amplifier 434.

Whenever the voltage applied to input 01 of the comparator amplifier 434 exceeds the voltage fed back from the percent DAC 456 at the second input and switches 435, 436, 444 and 446 are open, the gain of the amplifier 434 together with the gain of the high impedance, high gain amplifier 462 is sufficient to change the output of the amplifier 462 from a 0 logic level of 0.0 volt to a 1 logic level of +4.0 volts.

Assume now that it is desired to store the voltage level applied to input 01 of the comparator amplifier 434 on capacitor memory M–I. The percent digital-to-analogue converter 456 is set to 0.0 percent so that the output of the unity gain amplifier 458 is connected to input 02. Switches 444 and 446 are closed. When the voltage is applied to input 01, amplifier 434 produces an output which is applied to input 01, amplifier 434 produces an output which is applied through the switches 444 and 446 and the diodes 448 and 450 to rapidly charge the capacitor memory M–I. The voltage level on memory M–I is fed back through the amplifier 458 and the percent DAC 456, without division, to input 02 of amplifier 434 until the feedback voltage at input 02 equals the input voltage at input 01. Then the output from the comparator amplifier terminates and the voltage stored on the memory M–I is equal to the voltage at input 01. The procedure for storing a voltage on memory M–II is the same except that switches 435 and 436 are closed rather than switches 444 and 446 and the percent DAC 456 is programmed at 100 percent. The most positive voltage applied to input 01 during a given time period can be stored on capacitor memory M–I by closing only switch 444, or on memory M–II by closing only switch 435 as a result of diodes 448 and 438, respectively. Similarly, the most negative voltage value can be stored on M–I by closing only switch 446 so that the diode 450 is operative, or on M–II by closing only switch 436 so that diode 440 will be operative.

All dynamic measurements are based upon the reference voltage fed back from the percent DAC 456 to input 02 of the comparator 434. This feedback reference voltage is derived from the voltages stored on either or both of the capacitor memories M–I and M–II. For this reason, the automatic operation of the system provides a normalization I period during which a voltage is stored on memory M–I followed by a normalization II period during which a voltage is so stored on memory M–II. After normalization of either or both memories M–I and M–II, the voltage on either memory M–I or M–II, or a voltage equal to the voltage on M–I plus a programmed percent of the voltage on M–II minus the voltage on M–I may be fed back to input 02 of the comparator amplifier 434 and compared to the voltage at input 01. For example, the voltage on memory M–I can be applied to input 02 by programming the percent DAC to 0.0 percent. Similarly, the voltage on memory M–II may be applied to input 02 by programming the percent DAC 456 to 100 percent. When the percent DAC 456 is programmed to any percent other than 0.0 percent or 100 percent, it acts as a voltage divider so that the feedback reference voltage is equal to the voltage on memory M–I plus the programmed percent of the difference between the two voltages. For example, assume +1.0 volt on M–I and +2.0 volts on M–II with 40 percent programmed. The feedback reference voltage would then be +1.4 volts. Whenever the voltage at input 01 of comparator 434 is equal to or less than the voltage at input 02, the output of amplifier 462 is 0.0 volt or a logical 0, and whenever the potential at input 01 exceeds that at input 02, the output of amplifier 462 is +4.0 volts or a logical 1, assuming that switches 435, 436, 444 and 446 are open.

The output from amplifier 462 is applied to a transition detector 464. The transition detector 464 includes a counter which requires that a logic 1 level be present at the output of amplifier 462 for three successive counts of the low speed logic clock. If the output of amplifier 462 should return to 0 level before the count of three, the counter is reset and the count resumed when the output returns to a logic 1 level. The transition detector 464 also has a second counter and logic circuitry which can be programmed to indicate either the first or second transition. Positive transitions are indicated by the transition from logic 0 to logic 1. The first and second negative transitions are detected by inverting the logic signal from the amplifier 462 and using the same counters. Then when input 01 of comparator 434 changes from more positive to more negative than input 02, a transition will be detected. The transition signal is fed through conductor 468 to a dynamic sequence timetable 470 which transmits a stop count signal to the data counter control 284 as represented by the line 472 instructing the data counter control to terminate the data count by the counter 286.

The data readout system presently to be described utilizes J–K flip-flops, such as the Texas Instruments type SN 530 shown symbolically in FIG. 16, for the various binary stages. The J–K flip-flop can switch states only on a clock pulse applied to the clock line CL, and then only if the inputs J*, J, K, K* are at the proper logic levels. The flip-flop has true and complement outputs T and C, and a logic 1 state is defined as a logic 1 level on the true output. The flip-flop can be reset immediately to a logic 0 state by a logic 1 level on reset input R. It will be noted that inputs J and K are inverted prior to application to the J' and K' AND gates.

The truth table in FIG. 17 illustrates the operation of the J–K flip-flop. The first four columns $J_n$ and $K_n^*$ indicate the state of J, K, J* and K* inputs after clock pulse $n$, and the fifth column indicates the state of the true output T after the next clock pulse $n+1$. The letter C in column $T_{n+1}$ indicates that the flip-flop complements, while the symbol $\overline{C}$ indicates that the flip-flop does not complement.

The truth table of FIG. 18 is applicable for all conditions and shows the operation of the flip-flop in terms of the outputs of AND gates J' and K'. Thus it will be noted that when the outputs of both J' and K' are at logic 1, the flip-flop does not complement. When the outputs of both J' and K' are logic 0, the flip-flop complements either from a logic 1 state to a logic 0, or from a logic 0 state to a logic 1 state, depending upon the state of the flip-flop prior to clock pulse n+1. If the output of J' is a logic 1 and the output of K' is a logic 0, the flip-flop is switched to the logic 1 state. If the output of gate J' is a logic 0 and the output of gate K' is a logic 1, the flip-flop goes to the 0 state.

The dynamic measurement sequence is automatically controlled by the dynamic sequence timetable 470 and the dynamic sequence interface 474. The low speed logic clock represented by the time line 384 in the timing diagrams of FIGS. 9, 11 and 12 provides, as previously mentioned, the cadence for the dynamic measuring subsystem. On the first low speed clock pulse after the a start measurement signal 614 from the delay test timer 255, a dynamic start measurement signal 620 is produced. This signal initiates the rise of a start scan pulse 622a on time line 622 which lasts for one low speed clock pulse. One clock pulse after the dynamic test start signal comes up, major scan I signal 624 comes up and stays up until both major scans have been completed. At the completion of major scan I, a second scan start pulse 622b is generated and lasts for one clock pulse and causes major scan II signal 626 to come up to a logic 1 level. A Major scan I signal (MS–I) and major scan II signal (MS–II) are used to gate the appropriate program information out of the various memories at the proper time as will hereafter be described. Major scan I period is indicated by major scan I signal 624 being up and major scan II signal being down, and the major scan II period is indicated by both major scan I and major scan II signals being up. After the ten interlace scans of major scan II, start measurement signal 620 falls to 0 logic level, thereby instigating the test complete signal 616 and the record test results signal 618 in FIG. 8. One clock pulse later, major scan I signal 624 and major scan II signal 626 return to O logic level.

FIG. 11 illustrates by time lines the sequence of events within a major scan, for example major scan I, when a peak amplitude is not to be stored. At the fall of scan start pulse 622a and the start of major scan I, a normalize memory I signal 632 comes up for 3 milliseconds plus 80 low speed clock pulses. During this period, which may be hereafter referred to as normalization period I, a voltage is stored on capacitor memory M–I which is derived from a source determined by programmed information as will presently be described. At the end of normalization period I, a normalize memory II signal comes up for 3 milliseconds plus 80 low speed clock pulses. During this period a reference voltage is stored on memory M–II. This period is hereafter referred to as normalization period II. Then a normalize sample system signal 636 comes up for 3 milliseconds plus 20 low speed clock pulses as indicated by pulse 636a to permit the sampling system to normalize on the voltage at $T_0$.

At the end of the first normalization period 636a for the sampling system, the tens and hundreds decades of the staircase counter, which are used to count the 20 clock pulses, are reset to zero so that interlace scan IS–1 may start on the next low speed clock pulse. At the same time, the count data signal 638 comes up and activates the data counter 286 through the data counter control 284 so that it may also begin on the next count. The count data signal 638 stays up until a transition detection signal is received at the dynamic sequence timetable from the transition detector 464 through conductor 468 at which time the count data signal 638 returns to logic 0 level and the data counter ceases counting. During major scan I the data counter 286 counts in subtract mode, unless otherwise programmed. The normalize sampling system signal 636 may come up at the transition detection 638a to start the second normalization period 636b, or may optionally, by manual control, remain down until the staircase counter reaches a count of 399 in order to complete the entire interlace scan IS–1 for display purposes before starting the normalization period 636b. After the second normalization period 636b, interlace scan IS–2 starts. Normalization periods 636b, 636c, etc. are provided between the ten interlace scans to permit the sampling system to normalize at $T_0$. During the set of interlace scan periods, either a time or voltage measurement can be made. In either case, the data counter counts in subtract mode and merely continues the count during each interlace scan and the final data count at the end of interlace scan IS–10 represents the first measurement value. After the tenth interlace scan IS–10, scan start pulse 622b occurs and starts major scan II during which the same procedure is repeated, except that the data counter begins, without being reset, to count in the add mode so that the final reading of the data counter provides the differential measurement between the two measurements made during the two major scans.

When the peak amplitude occurring during a particular time interval is to be stored on either memory M–I or memory M–II, the sequence illustrated by the time lines in FIG. 12 is followed rather than the sequence illustrated in FIG. 11. The peak storage sequence is the same as the the normal storage sequence except that a store peak signal represented by the time line 640 comes up at the end of scan start pulse 622a. Normalize memory I signal 632, normalize memory II signal 634 and normalize sampling system signal 636 occur as previously described except that the first 10 interlace scans all proceed to the full 399 count. However, the data count signal 638 remains at 0 logic level during the first 10 interlace scans. A peak store signal 642 complements at the end of each of the first 10 interlace scans. The peak store signal 642 is used to effect the storage of one peak, designated peak A, on memory M–I during the odd numbered interlace scans IS–1, 3, 5, 7 and 9, and the storage of a second peak, designated peak B and usually of the opposite polarity, during the even numbered interlace scans IS–2, 4, 6, 8 and 10. After interlace scan IS–10, the 10 interlace scans are repeated during which the count data signal 638 is brought up to initiate the data count during each interlace scan as illustrated so as to make the desired amplitude or time measurements based on the voltage or voltages stored in memories M–I and/or M–II.

Although the automatic sequence provides for normalization periods I and II during which a voltage may be stored on memories M–I and M–II, respectively, and also provides, if desired, peak storage periods for storing a peak amplitude on either memory M–I or memory M–II during each of major scans I and II, it will be appreciated that never are more than two of these storage periods utilized, except when a memory is normalized at the opposite high voltage during peak storage, and frequently only one storage period is utilized. For example, assume that it is desired to measure the amplitude of the pulse 314a at $V_{S2}$ with respect to the voltage at $V_{S1}$. For this measurement, the staircase control 362 would be programmed, during normalization period I of major scan I, to produce a steady state voltage at the output of the staircase ladder network 358 at a level such as to produce a strobe pulse at time $V_{S1}$ within the fast ramp period $T_0-T_{4000}$. The sampling system automatically operates in the sampling mode unless a signal is received on cable 528 from the dynamic sequence interface to ground the probe and input to amplifier 356 by closing switches $L_nR_2$, $L_nR_3$ and 373 and connect the staircase ladder network 358 to the output 431 by opening switches 432 and 433. Nothing would be programmed for normalization period II of major scan I. For all voltage measurements, the sampling system is programmed to operate in reference mode during the interlace scan periods of both major scans I and II. By reference mode it is meant that the output voltage of the staircase ladder network 358 is applied to input 01 of the comparator amplifier 434. It will be noted that only capacitor memory M–I is being used to store a reference voltage during major scan I.

For major scan II, normalization pr period I, the staircase control 362 is programmed to operate in the steady state program mode and produce a constant staircase ladder network voltage selected to produce a strobe pulse at time $V_{S1}$, and the sampling system is programmed to operate in the sample mode. Nothing is programmed for normalization period II for major scan II. The sampling system is again programmed to operate in the reference mode, i.e., connect the ladder network 358 to input 01 of the comparator 434.

Then when the system is placed in the automatic operation, the system will first take repeated samples of the waveform at $V_{S1}$ during normalization period I of major scan I, and the voltage at $V_{S1}$ will be stored on memory M–I. It is immaterial for an amplitude measurement what voltage is stored on memory M–II because the DAC will subsequently be programmed at 0 percent. During each of the 10 interlace scans of major scan I, the staircase control 362 will automatically operate the staircase ladder network in the count mode, and the data counter 286 will automatically be initiated to count, in the subtract mode, the total number of low speed clock pulses occurring during the 10 periods defined by the start of each interlace scan and the subsequent transition detection. The total number will representative of the voltage at $V_x$ with respect to some unknown voltage level.

During normalization period I of major scan II, the sampling system takes repeated samples of the waveform at time $V_{S2}$ and this voltage is again stored in on memory M–I. Again the voltage stored on memory memory M–II is immaterial. The sampling system again operates in reference mode during the it interlace scans of major scan II, as will always be the case for amplitude measurements. The data counter 286 again is activated to count the total number of pulses occurring within the count periods of the 10 interlace scans of major scan II, but this time the data counter counts in the add mode. The final reading on the data counter is then a direct measure of the difference in the voltage between point $V_{S2}$ and point $V_{S1}$.

It will be appreciated that the amplitude between any two points on the waveform 314 within the time period $T_0$ and $T_{4000}$ can be measured in the same manner by selecting the proper voltage from the staircase ladder network to produce the strobe pulse at the desired time $T_n$ during then the normalization period of each major scan. It will also be appreciated that any voltage which can be stored on either memory M–I or M–II can be measured with respect to any other voltage which can be stored on one of the memories. Therefore any point on the waveform can be measured with respect to any reference voltage. In particular, any of the 4,000 voltage levels from the staircase ladder network may be stored on either of the memories M–I or M–II by operating the ladder network at the programmed level and operating the sampling system in the reference mode during the appropriate normalization period. Of course, the voltage at any lead of the device identifiable by time may be measured with respect to the voltage at any other device lead which is identified by time. Further, either positive or negative peak voltages, $+V_P$ or $-V_P$ on the waveform 314 for example, may be stored and measured during a major scan period. For example, $+V_P$ could be stored, when operating in the peak store mode of FIG. 12, on memory M–I during interlace scan periods 1, 3, 5, 7 and 9 by closing only switch 444 and operating the staircase ladder network in the count mode and the sampling system in sample mode, Then the peak voltage $+V_P$ would be measured during the second 10 interlace scans by standard voltage measurement procedures. This measurement could be programmed during either major scan I or major scan II so as to provide a measurement relative to any other voltage stored and measured during the other major scan. The negative peak $-V_P$ could be measured in precisely the same manner except that it would be stored on memory M–I by closing switch 446 during the first 10 interlace scans.

Time measurements can be made between amplitude percent levels or voltage levels. In order to obtain percent levels, it is first necessary to define the 0 percent and 100 percent levels, which may hereafter be referred to as normalization points, by a time $T_n$ between $T_0$ and $T_{4000}$, or by a known or selected reference level, and then to store these reference values on memories M–I and M–II, respectively, during MS–I and MS–II, respectively. Then the percent DAC is programmed to derive the desired percent level to be detected during each major scan. For example, assume that it is desired to measure the rise time of the pulse 314b between a lower percent level $V_X$, such a 15 percent, and a higher percent level $V_Y$, such as 85 percent, based upon a 0 percent value at $V_{S1}$ and a 100 percent value at $V_{S2}$. The voltage $V_{S1}$ would be stored on memory M–I during normalization period I of major scan I, and $V_{S2}$ would be stored on memory M–II during normalization period II of major scan I. The percent DAC 456 would be programmed for 15 percent during the 10 interlace scans of major scan I and the sampling system would be operated in the scan mode during major scan I. The data counter 286 would then count, in subtract mode, the low speed logic clock pulses, and hence the number of samples, from $T_0$ until a transition at $V_X$ for each of the 10 interlace scans and thereby sum the total number of samples during the 10 scans. During major scan II the voltages $V_{S1}$ and $V_{S2}$ would again be stored on memories M–I and M–II during normalization period I and normalization period II. However, the DAC 456 would be programmed for 85 percent during the 10 interlace scans of major scan II. As a result, the data counter 286, counting in add mode, would then count the total samples taken during the 10 interlace scans from $T_0$ until a transition at $V_Y$ of each scan. The reading on the data counter would than represent the time required for the pulse 314b to rise from the 15 percent level to the 85 percent level. Of course, it will be appreciated that any percent level between two reference voltages stored on memories M–I and M–II can be detected merely by programming the DAC 456, and the time period between any two such detectable percent levels can be measured as described above.

It will be appreciated that other voltage levels on the waveform can be defined as the 0 percent and 100 percent normalization points. For example, the negative peak $-V_P$ might be selected as the 0 percent level and the positive peak $+V_P$ selected as the 100 percent level. Or the voltage at $V_{S1}$ might be selected as the 0 percent level and the positive peak $+V_{P1}$ as the 100 percent level, etc.

Since the transition detector 464 can be programmed to detect either the first or second positive transition, or the first or second negative transition, time measurements can be made between any percent level on any transition and any other percent level on any other transition within the count capabilities of the transition detector. Further, since the sampling system may be connected to sample the waveform at any one lead during major scan I and any other waveform during major scan II, time measurements may be made between any identifiable transition point on a waveform occurring at one lead and any identifiable transition point on another waveform occurring at any other lead. For example, if the waveform 314 is an input waveform at one lead, and the waveform 315 is the waveform at a complementary output lead, the delay time between a percent transition point on waveform 314 and the corresponding percent transition point, or any other detectable point, on the waveform 315 can be measured. It is to be understood that the above enumerated measurements are merely exemplary. It will occur to those skilled in the art that many other measurements can be made using the basic capabilities of the system.

The test station memory 524 stores program information for major scan I and major scan II and program information for controlling the DC bias supply and static measurement relays $L_nK_n$. This information is gated through a test station interface 526 to the test station relay drivers 150 by the major scan I signal (MS–I) and the major scan II signal (MS–II) from the dynamic sequence timetable. The ground probe signal represented by the control in line 528 from the dynamic sequence interface 474 is also fed to the test station interface to open relays $L_nR_1$ and close relays $L_nR_2$ and $L_nR_3$ when the sampling system is being operated in the reference mode.

Memories M –M store program information concerning whether the respective DC bias supplies 01–010 are to operate as voltage or current supplies, the magnitude and polarity, and the time at which the respective supplies are to be activated. Pulse generator memories 243 and 244 are programmed with information concerning the time of activation, rise time, fall time, amplitude, pulse width, etc. The test start em memory 296 is programmed with information concerning the time at which the test start signal 608 occurs and the delay period for the delay test timer 255. The measurement, type and range memory 294 is programmed with information concerning whether a static or dynamic measurement is to be made, and whether a voltage, current, amplitude or time measurement is to be made, and the range. This program information is fed to the static test control 292 by cable 293, and to the fast ramp generator, the dynamic sequence timetable and the range and type decoder 516 by cable 519. The digital sync memory and interface 311 is programmed with information concerning the period of the reset clock, the period of the variable clock, the delay period of the delay clock, and the time position of the sample clock.

Normalization I memory 476 stores program information for controlling the operation of the sampling system during the normalization I periods of both major scan I and major scan II. Normalization II memory 478 stores program information concerning the operation of the sampling system during normalization II periods of both major scan I and major scan II. A percent DAC and transition detector memory 480 has major scan I and major scan II sections. Gate logic circuit 482 gates out either the major scan I information of or them the major scan II information from the normalization I memory 476 in response to major scan I signal MS–I and major scan II signal MS–II from the dynamic sequence timetable. It will be recalled from FIG. 9 that when the major scan signal MS–I is up and major scan signal MS–II is down, major scan I period is indicated. Thus during major scan I, the information for normalization period I of major scan I is gated out through cable 483 to the staircase control 362 and through cable 484 to the dynamic sequence timetable 470 and to the dynamic sequence interface 474. T Similarly, gate logic circuit 485 alternatively gates out either the normalization II program information for major scan I or major scan II in response to the major scan signal MS–I and major scan signal MS–II received from the dynamic sequence timetable. This information is applied through cable 486 to the staircase control 362 and through cable 487 to the dynamic sequence timetable 470 and to the dynamic sequence interface 474. Since the normalization I and normalization II program information for major scan I is simultaneously gated to the staircase control, the staircase control selectively gates either normalization I program information program information or normalization II program information to the staircase ladder network in response to the signals 632 and 634 (see FIG. 11) on lines N–I and N–II, respectively. The same procedure occurs during major scan II. A line designated by the reference character C feeds a signal signal to the staircase control 362 from the dynamic sequence interface 474 to cause the staircase ladder network to be connected to the staircase counter and operate in the count mode. Lines $C_{20}$ and $C_{80}$ sense when the staircase count reaches the counts of 20 and 80 and this information is used by the dynamic sequence timetable to terminate the normalization periods I AND II and the normalization period for the sampling system as previously described and reset the staircase counter by the reset line 475. The dynamic sequence timetable 470 and the dynamic sequence interface 474 also contain gate logic necessary to sequentially employ the normalization I and normalization II program information that is fed simultaneously through the cables 484 and 487 during each of the major scans. In particular, the dynamic sequence interface 474 gates the normalization I and normalization II information to the switches 435, 436, 444 and 446 through the cable 488.

The slope of the fast ramp from the fast ramp generator 322 may be selectively varied during the normalization periods I and II and the scan periods of both major scan I and major scan II. This permits the range to be expanded (i.e., the slope of the ramp decreased to increase the field of view) so that either or both of the voltage memories M–I and M–II may be normalized at a more stable point on the waveform remote from the points to be measured. For example, if a rise time between two percent levels is being measured, the 100 percent normalization point can be picked at a delayed point on the waveform which is more stable by increasing the field of view, and then, by again decreasing the field of view for the actual measurement, the resolution may be maximized by the narrowed field of view. The range information for the four normalization periods is stored in the normalization I and normalization II memories 476 and 478 and gated out by gate logic circuits 482 and 485 through cable 477 to the measurement type and range memory 294 during the appropriate period. The appropriate period is determined by the logic levels on the control lines MS–I, MS–II, N–I and N–II going to each of the gate logic circuits 482 and 485, as heretofore described. The information is then passed through cable 519 to the ramp generator 322.

Gate logic circuit 490 similarly gates through major scan I or major scan II information in response to the application of the major scan signals MS–I and MS–II. This information is fed through cable 493 to a percent DAC interface 494 which controls the operation of the percent DAC 456. The normalization I and normalization II signals N–I and N–II, respectively, are also applied to the percent DAC interface 494. The normalization I signal automatically switches the percent DAC to 0.0 percent and the normalization II signal automatically switches the percent DAC to 100 percent. The absence of either signal switches the percent DAC to the programmed percent. Gate logic 490 also gates out the transition detection program information for either major scan I or major scan II and this is applied to the transition detector 464 by control cable 496. Since the transition detector 464 is operative only during the interlace scan period, program information is required only for major scan I and major scan II. However, the program information to the transition detector permits the selective detection of the first or second positive or the first or second negative transitions during either major scan period to permit comparative time measurements between any two of these four transitions.

A data counter memory 500 stores program information regarding the operation of the data counter 286 and this information is fed to the data counter control 284 which in turn controls the data counter 286. The output from the data counter 286 is applied to a pair of digital comparators 502 and 504 which are programmed from minimum limit memory 506 and maximum limit memory 507, respectively, to determine whether the data count is less than, greater than or equal to the programmed minimum, or less than, greater than or equal to the programmed maximum. The output from each of the digital comparators 502 and 504 is applied to a display unit 508 and to a classification unit 509 as represented by the data lines 510 and 512, respectively. The data count from the counter 286 is also applied to a binary-to-decimal decoder 514 which decodes the data count to decimals, and the decimal information is fed to the display unit 508.

The display unit 508 displays basic measurement data such as the count, the type of measurement, and the range of measurement. The type and range information is received from the range and type decoder 516. The range and type decoder received information from the measurement type and range memory 294 by cable 519 and from the static test control 292 by control cable 520. The range and type decoder supplies information not only to the display unit 508, but also to both digital comparators 502 and 504 and to a recorder ie interface 522 as illustrated. The recorder interface 522 is also receives data from the display unit and converts this data together with the range and type information into a form such that it can be recorded on punched tape, punched card, magnetic tape, or other suitable means.

The logic diagram for the data counter 286 is shown in FIG. 16. The data counter is comprised of J–K flip-flop binary stages $U^0$, $U^1$, $U^2$ and $U^3$ which form a units decade, $T^0$, $T^1$, $T^2$ and $T^3$ which form a tens decade, $H^0$, $H^1$, $H^2$ and $H^3$ which form a hundreds decade, and $Th^0$ and $Th^1$ which form a thousands decade having only a three count capability. These binary stages count in a 1:2:4:8 code and provide a total count capability of 3,999. The state of binary stages $U^0$–$U^3$, which are representative of each decade, when counting in the forward direction, is illustrated in FIG. 14, and FIG. 15 illustrates the state of these binaries when counting in the reverse direction. The clock pulses being counted, either the pulses from the low speed clock pulse generator 382 or from the pulse shaper 278 at the output of the voltage-to-frequency converter, are applied through clock line 1404 and passed through an inverting NAND gate and parallel inverters to provide the necessary fan-out power to a clock bus C1. Similarly, a reset signal is applied through line 1406 and an inverting NAND gate and reinverter to a reset bus R. Both the clock bus C1 and reset bus R are connected to each of the fourteen binaries of the data counter.

The count forward control comes in one line 1400 and is in negative or complement logic as indicated by the $\bar{F}$ symbol. Thus when not counting in the forward direction, line 1400 will be at a logic 1 level, and when counting in the forward direction, line 1400 will be at logic 0 level. The count forward control line 1400 is connected directly to both the J* and K* inputs of binary $U^0$. The count in reverse control line 1402 is true logic. Thus when counting in reverse, line 1402 is at a logic 1 level and when not counting in reverse, line 1402 is at a logic 0 level. The reverse control line 1402 is connected to both the J and K inputs of binary stage $U^0$. It will be recalled that the J-K flip-flop has the characteristic of being complemented from either the 1 state to the 0 state or from the 0 state to the 1 state when the inputs from control line 1400 and line 1402 are of the same logic level, and not being complemented when line 1400 is a logic 1 level and line 1402 is a logic 0 level. Thus when counting forward, line 1400 is at a 0 logic level because negative logic is used on line 1400, and line 1402 is also at a 0 level because true logic is used on that line. Thus binary $U^0$ complements on every clock pulse. Similarly, when counting in reverse, input line 1402 is at a logic 1 level, and input line 1400 is also at a logic 1 level, again considering the negative logic. Thus binary stage $U^0$ complements on every clock pulse when counting in reverse. When neither counting in reverse nor counting forward, line 1400 will be at a logic 1 level and line 1402 will be at a logic 0 level in which case binary $U^0$ does not complement on the clock pulses.

The control circuitry for counting in the forward direction is comprised of the five NAND gates $F_1$—$F_5$ for each decade of four binaries, and the reverse count control circuitry is comprised of NAND gates $R_1$—$R_4$ for each decade plus an inverter at the output of each NAND gate to form an AND gate. When not counting in either the forward or reverse direction, line 1400 is at a logic 1 level so that the output from gate $F_1$ is at a logic 0 level and this output disables NAND gates $F_2$—$F_5$ which then have a logic 1 output level so that all J* and all K* inputs to the binaries are at a logic 1 level. When not counting in the reverse direction, control line 1402 is at 0 logic level so that the output from the inverters at the output of NAND gates $R_1$—$R_4$ are also at 0 logic level so that the J and K inputs to all binaries are at 0 logic level. Thus the binaries do not complement but remain in the last state to which they were set. In order to complement any one of the binaries merely requires that the J* and K* inputs be changed from a logic 1 to a logic 0, or in the alternative, that the J and K inputs be changed from a logic 0 to a logic 1 level. Thus it will be appreciated that unless either the count forward or count in reverse lines are at logic 0 or logic 1 level, respectively, the counter is disabled.

The operation of the units decade $U^0$—$U^3$ when counting in the forward direction can best be understood by reference to FIG. 14 which shows a time line 1408 representing successive clock pulses coming in on line 1404, and time lines each representing the logic level of one of the binary stages $U^0$—$U^3$. The count after any clock pulse may be determined by summing the values assigned the binaries that are in the 1 state, the binaries $U^0$—$U^3$ representing $2^0$, $2^1$, $2^2$ and $2^3$, respectively, and thus numerical values of 1, 2, 4 and 8. A count of zero is indicated between the zero clock pulse and the one clock pulse, a count of one between the one and two clock pulses, etc. It will be noted from FIG. 14 that on the zero count all binary stages $U^0$—$U^3$ are at 0 logic level. It will also be noted that binary $U^0$ complements on every clock pulse when counting forward. This is achieved by directly connecting the forward count line 1400 to the J*-K* inputs of $U^0$. All gates $F_1$-$F_5$ are disabled by a logic 1 on line 1400 and enabled by a logic 0 on line 1400. Assuming that line 1400 is at a logic 0 level, stage $U^1$ complements on the next clock pulse after $U^0$ is in the 1 state and $U^3$ is in the 0 state, by reason of gate $F_2$. Stage $U^2$ complements on the first clock pulse after binaries $U^0$ and $U^1$ are in the 1 state, by reason of gate $F_3$. Stage $U^3$ is set to a 1 level as a result of the operation of gate $F_4$ on the first clock pulse after $U^0$, $U^1$ and $U^2$ are all at logic 1 level, and goes to a 0 level on the first clock pulse after $U^0$ and $U^3$ are in the 1 state, by reason of gate $F_5$.

The output of gate $F_5$ is also connected to the J*—K* inputs of stage $T^0$ of the tens decade $T^0$—$T^3$ so that stage $T^0$ is complemented to a 1 level on the same clock pulse that stages $U^0$ and $U^3$ compel complement to a 0 state so that after ten counts in the units decade, the tens decade is incremented one count. The tens decade $T^0$—$T^3$ operates in the same manner as the units decade just described, except that stage $T^0$, as well as the other binary stages, can complement only once after each ten counts of the units decade. Gate $F_5$ of the tens decade enables binary stage $H^0$ of the hundreds decade $H^0$—$H^3$ on the same clock pulse that the tens decade goes back to a count of zero by the enable signal gated from the units decade after the count of nine. The hundreds decade then operates in the same manner as the tens decade through a ten count. After the hundreds decade reaches a count of nine, gate $F_5$ of the hundreds decade is enabled so that the enable signal from the units and tens decades can enable the thousands decade.

FIG. 15, which is similar to FIG. 14, illustrates the state of binary stages $U^0$—$U^3$ when the counter is counting in reverse. Gates $R_1$—$R_4$ for each of the first three decades and gate $R_1$ for the thousands decade control the reverse operation of the counter. The gates $R_1$—$R_4$ are enabled only when the reverse count control line 1402 is at a logic 1 level. The units binary stage $U^0$ again complements on every clock pulse since the reverse input line 1408 is connnected to the J and K inputs of binary $U^0$. It will be noted that the logic 1 level of $U^0$ in FIG. 15 is between clock pulses numbers one and zero, as compared to between clock pulses one and two in FIG. 14 which represents the forward count. From FIG. 15, it will be noted that stage $U^3$ complements on the first clock pulse after $U^0$, $U^1$ and $U^2$ are in the 0 state as determined by the output of gate $R_3$. Binary stage $U^2$ complements on the first clock pulse after $U^0$ and $U^1$ are in the 0 state, except on the count of zero. This is accomplished by gate $R_2$ which is satisfied from the inverted output of gate $R_1$ and the complement output of stage $U^1$. The count of zero is derived from the output of gate $R_4$ through a gate $R_1$. Stage $U^1$ is complemented on the first clock pulse after $U^0$ is in the 0 state except on a count of zero by the output of gate $R_1$. A count of zero is indicated by the output of gate $R_4$ being in the 1 state. It will be noted that gates $R_2$ and $R_4$ are not connected directly to line 1402, but do receive this logic information from gates $R_1$ and $R_3$. Thus before any stage can be complemented, the reverse line 1402 must be at a logic 1 level. This insures that the counter will always be stopped on the last count when the reverse count line 1402 goes to a 0 logic level.

The output of gate $R_4$ is inverted and applied to the J-K inputs of binary $T^0$ and to gates $R_1$ and $R_3$ of the tens decade to cause the tens decade to count in reverse in the same manner, but to only increment when the units decade goes from zero to nine. Gate $R_4$ of the tens decade is in turn connected to the J-K inputs of binary stage $H^0$ and to gates $R_1$ and $R_2$ of the hundreds decade so that the hundreds decade will be incremented one count in reverse each time that the tens decade is set from zero to nine. Similarly, gate $R_4$ of the hundreds decade is connected to the J-K inputs of binary stage $Th^0$ and to gate $R_1$ of the thousands decade to increment the thousands decade one count in reverse each time that the hundreds decade is set from zero to nine and the units decade is set from zero to nine.

The true and complement sides of all binary stages of the data counter are fed out to the digital comparators 502 and 504 and to the binary-to-decimal decoder 514, and these output lines are indicated collectively by the reference numeral 1410.

To summarize, it will be noted that the data counter 286 is turned off when the count forward line 1400 is at a logic 1 level indicating no forward count, and reverse control line 1402 is at a logic 0 level indicating no reverse count because the J*–K* inputs will be at a logic 1 level and the J–K inputs will be at a logic 0 level. Then to count forward, line 1400 is changed to a logic 0 level so that when it is desired to complement a particular binary stage, this 0 logic level is merely gated to the J*–K* inputs of the binary stage. When counting in the reverse direction, line 1402 is raised to a logic 1 level. Then each binary may be complemented by gating this logic level through to the J and K inputs of the binary at the appropriate time. It is important to note that when either a forward or reverse count is terminated, all binary stages are instantly placed in the noncomplementing mode so that the number count on the counter will be preserved. The next count, usually in the opposite direction may then start from the previous number. The counter may also be preset to zero merely by pulsing the reset line 1406.

The data counter 286 is controlled by the data counter control 284 shown in detail in FIG. 19. As previously described, the data counter 286 is used for both static and dynamic measurements. When making a static measurement, the static input line 1500 is at a logic 1 level and the dynamic input line 1502 is at logic 0. When making a dynamic measurement, these logic levels are reversed. Thus when a dynamic measurement is being made, AND-OR gate 1504 gates through the low speed logic clock from line 1506, and when a static measurement is being made, gate 1504 gates the pulse train from line 1508, which is derived from the pulse shaper 278, through to line 1404. Line 1404 is the clock input line to the data counter so that either the low speed logic clock or the pulse train from the static measurement subsystem is continuously applied to the binary stages and gates of the data counter as heretofore described.

An important function of the data counter control 284 is to cause the counter to count in the direction necessary to accomplish the desired addition or subtraction and thereby produce differential measurements. This is accomplished by AND-OR gates 1512, 1514 and 1516. An AND-OR gate requires that all inputs to a particular input NAND gate, for example gate 1512a, be at a logic 1 level to produce a logic 1 level at the output 1512e. During dynamic measurements, major scan I line 1518 (MS–I) will be at logic 1 during major scan I and major scan II line 1520 (MS–II) will be at logic 0. During major scan II, line MS–1 will be at logic 0 and line MS–II at logic 1. Unless programmed to the contrary, the subtract program line SUB will be at a 0 logic level, and add program line ADD will be at a logic 1 level. During a dynamic test, gates 1512a and 1512b are enabled by the logic 1 level on dynamic test line 1502, and gates 1512c and 1512d are disabled by the logic 0 level on static test line 1500.

Then during major scan I, gate 1512a is disabled by the 0 level on line 1520 and gate 1512b is enabled by the logic 1 level on major scan I line 1518. However, since subtract program line SUB is at 0 logic level, the output from gate 1512e will be at 0 logic level during major scan I. The subtract control line 1526 is derived from the output of gate 1512e by an inverter 1528, so that subtract control line 1526 is at a logic 1 level, thus indicating the subtract mode. The add control line 1530 comes directly off the output of gate 1512e and is therefore at a 0 logic level. During major scan II, gate 1512b is disabled by the 0 logic level on line 1518 and gate 1512e is enabled by the 1 logic level on line 1520 so that the logic 1 level on add program line ADD is gated through to the output of gate 1512e, thereby changing the subtract control line 1526 to logic 0 and the add control line 1530 to a logic 1.

If addition is programmed during major scan I and subtraction is programmed during major scan II, subtract program line SUB will be at a logic 1 level and addition program line ADD will be at a logic 0 level. In this case it will be evident that add control line 1530 will be at 1 logic level during major scan I and subtract control line 1526 will be at 0 logic level, and that add control line 1530 will be at 0 logic level during major scan II and subtract control line 1526 will be at a logic 1 level, indicating addition during major scan I and subtraction during the major scan II.

A zero control line 1532 is at logic 1 level when the data counter is at a count of zero, and is at 0 logic level for all other counts. This logic is derived by NAND gate 1534 and the inverter 1536 from lines 1538 which extend from the binary-to-decimal decoder 514, and which are all at a logic 1 level when the data count is zero.

The algebraic sign of the data in the data counter at any time is determined by the state of the J–K flip-flop binary AS, the true output 1540 being representative of a positive value and the complement output 1542 being representative of a negative value. These lines extend to the digital comparators 502 and 504 which are hereafter described in greater detail to provide the necessary sign data information as will hereafter be described in greater detail.

The add control line 1530, subtract control line 1526, zero control line 1532, positive control line 1540 and negative control line 1542 are used to determine the direction in which the data counter 286 is operated at any point in time and also the state of the algebraic sign binary AS. First consider the operation of the binary AS. Binary AS complements whenever the line 1544 from the output of AND-OR gate 1514 goes to a logic 1 level and remains in the same state, i.e., does not complement, whenever line 1544 is at a logic 0 level because the J* and K* inputs are connected to a voltage supply $V_{cc}$ which provides a logic 1 level. The reset is connected to ground and thereby disabled. The only time that binary AS changes states is on the first clock pulse after the data counter has reached a count of zero. Thus the zero control line 1532 enables both gates 1514a and 1514b. It is necessary to change the sign of the data when the data count is zero, when the sign is positive, i.e., when line 1540 is at logic 1 level, and when the counter is subtracting. When these conditions are satisfied, gates 1514b and 1514c produce an output which complements binary AS. Binary AS is also complemented on the first clock pulse after a count of zero when the sign of the data is negative, that is line 1542 is at a logic 1 level, and the counter is adding. When these conditions are satisfied, gates 1514a and 1514c produce an output which complements binary AS. Thus when either of these conditions is satisfied, line 1544 goes to a logic 1 level and complements the sign binary AS to insure that the sign of the data identified by the count in the data counter will always be correct.

The data counter counts forward when the data count is zero, counts forward when the sign of the data is negative and the counter is subtracting, and counts forward when the data is positive and the counter is adding, and counts in reverse under the complement conditions. The AND-OR gate 1516 performs these logic functions, and the output of gate 1516c is the true forward signal. Thus the positive line 1540 and the add control line 1530 form the inputs for gate 1516a, and the negative line 1542 and the subtract control line 1526 are the inputs to gate 1516b. The outputs of gates 1516a and 1516b are ORed with the inverted output from gate 1514 which is representative of the zero count condition, the other inputs to AND-OR gate 1514 being redundant to this logic requirement. The output of gate 1516 is applied to a NAND gate 1545 the output of which is line 1400 of the data counter. The output from gate 1545 is also connected to an input to gate 1546. Both gates 1545 and 1546 are enabled by a logic 1 level on line 1548 for purposes which will presently be described. Thus when gates 1545 and 1546 are enabled, the output of gate 1545 is at a logic 1 level when the counter is to count forward and is at a logic 1 level when the counter is not to count forward. The output of gate 1546 is connected through an inverter 1550 to the reverse count control line 1402 of the data counter, and therefore will be the complement to line 1400 when both are enabled. In summary, when the enable line 1548 is at logic 0 level, both gates 1545 and 1546 are disabled so that the not forward line 1400 is at a logic 1 level and the reverse line 1402 is at a logic 0 level, in which condition the data counter is stopped. When the enable line 1548 is at a logic 1 level and the output from gate 1516 is at a logic 1 level indicating a forward count, not forward line 1400 is at a logic 0 level and reverse line 1402 is at a logic 0 level thus causing a forward count. On the other hand, when the output of gate 1516 is at a 0 logic level, indicating a not forward, i.e., reverse count, condition, and the enable line 1548 is at a logic 1 level, not forward control line 1400 will be at a logic 1 level and reverse control line 1402 will also be at a logic 1 level causing a reverse count.

During a static measurement, dynamic control line 1502 is at a logic 0 level thereby disabling gates 1512a and 1512b, and static control line 1500 is at a logic 1 level thereby enabling gates 1512c and 1512d. A positive line 1552 and a negative line 1554 are received from the static measurement subsystem 230 indicating the sign of the measurement made by that subsystem. This information, together with the add and subtract information from program lines ADD and SUB, is gated through gates 1512c and 1512d. Thus when addition is programmed and the voltage or current measured is positive, the output of gate 1512 is a logic 1, indicating addition to whatever value is stored in the data counter. On the other hand, if the negative line 1554 is at a logic 1 level and the positive line 1552 is at a logic 0, the output from gate 1512 will be logic 0, indicating that the negative value should be subtracted from that stored in the data counter.

When a test start signal is received from the delay test timer 255 on line 1560, binary $S_4$ is set from a 0 state to a 1 state on the next low speed clock pulse which comes in on line 1562. Binary $S_4$ is set to the logic 0 state when line 1560 is at 0 logic level. Binary $S_5$ is normally set at a logic 0 level because the complement output of binary $S_4$ is connected to input J of binary $S_5$ and the true output of $S_4$ is connected to input K. Thus on the next clock pulse after binary $S_4$ changes to logic 1 state, binary $S_5$ changes to a logic 1 state. The purpose of binaries $S_4$ and $S_5$ is to generate a reset pulse for the data counter prior to the start of a test. The true output of binary $S_4$ is connected to gates 1564, 1566 and 1568, and the complement output of binary $S_5$ is also connected to an input of each of these three gates. Gate 1564 always produces a negative going pulse having a period equal to the period between successive low speed clock pulses on line 1562 because the output of gate 1564 goes to 0 logic level when $S_4$ changes to a logic 1 state, and goes back to a logic 1 level when $S_5$ changes to logic 1 state. This negative pulse is converted to a positive pulse by gate 1569 and this pulse resets binaries $S_6$, $S_7$, $S_8$ and DR to the 0 state which will presently be described in connection with static measurements. Also, if the data counter is to be preset before each test, preset program line 1567 will be at logic 1 level, and gate 1566 will produce a negative reset pulse which is inverted by gate 1570 to a positive pulse which is applied to reset line 1406 of the data counter and the data counter preset to zero. Similarly, if autoranging is programmed during a static test, program line 1571 will be at logic 1 so that a negative pulse will be produced by gate 1568 which is also converted to a positive pulse on the reset line 1406 by gate 1570 to preset the data counter to zero. The data counter may also be manually preset to zero by bringing line 1572 up to a logic 1. This logic level is inverted by gate 1574 and applied to the output of gate 1570 which then goes to a logic 1 level. The output of inverter gate 1574 is also applied to gate 1569 so that binaries $S_6$, $S_7$, $S_8$ and DR will be preset to 0 state. Thus it will be noted that for a dynamic test, the data counter may or may not be preset to zero, depending on whether averaging is to be obtained as hereafter described. Binaries $S_6$, $S_7$, $S_8$ and DR are always preset to 0 state at the beginning of a test. When a static measurement is being made and automatic ranging is programmed, the data counter is always preset to zero.

The true output of binary $S_5$ is connected by a test enable line 1580 to the input gates 1582a and 1582b or an AND-OR gate 1582. Gate 1582a is enabled during a dynamic test, and gate 1582b is enabled during a static test by lines 1502 and 1500, respectively. The output of gate 1582a therefore goes to a logic 1 level during a dynamic measurement when count data line 1583 from the dynamic sequence timetable 470 goes to a logic 1, and goes to a logic 1 level during a static measurement when line 1585 from binary $S_8$ of the 2 millisecond gate pulse generator, which will hereafter be described, goes to a logic 1 level. The output from gate 1582c goes to a divide-by-one control gate 1584, to gate 1586 and to control gates a, b, c, and d of a ring counter 1599 having binaries $D_2$—$D_5$ which provides a division capability as will presently be described.

The ring counter 1599 is comprised of binaries $D_2$—$D_5$ and control gates a—g and has a the capability to count up to five successive clock pulses. On the first co clock pulse, binary $D_2$ switches from 0 state to 1 state. On the second clock pulse, binary $D_2$ switches to 0 state and binary $D_3$ switches to 1 state. On the third pulse, binary $D_3$ switches to 0 state and binary $D_4$ switches to 1 state. On the fourth clock pulse, binary $D_4$ switches to 0 state and binary $D_5$ switches to the 1 state, and on the fifth pulse, binary $D_5$ switches to the 0 state. This is a accomplished by reason of the fact that binaries $D_2$—$D_5$ are each controlled by the J* and K* inputs because the J and K inputs, and the reset inputs, are all connected to a logic 0 source, i.e., ground. Thus when the J* and K* inputs are at logic 0, the binaries complement. When inputs J* and K* are at a logic 1, the binaries do not complement The complement output of binary $D_2$, when $D_2$ is in the 0 state, causes the output of gate 1600 to be a logic 1 and the output of gate d to be a logic 0, thereby always complementing binary $D_2$ back to the 0 state on the first clock pulse after going to the 1 state. The complement outputs of binaries $D_2$ and $D_3$ are connected through gate e and gate a to the J* and K* inputs of binary $D_3$. Thus when either binary $D_2$ or $D_3$ is in the 1 state, the J* and K* inputs are at 0 logic level so that binary $D_3$ complements. If both binaries $D_2$ and $D_3$ are in the 0 state, binary $D_3$ does not complement. Or if the output of gate 1582c is at 0 logic s level, gate a is disabled so that binary $D_3$ does not complement. Binary $D_4$ is similarly controlled from the complement outputs of binaries $D_3$ and $D_4$ through gates f and b, and binary $D_5$ from the complement outputs of binaries $D_4$ and $D_5$ through gates g and c. It is important to note that all binaries are inhibited from complementing if the count data lines goes to logic 0 level and the output of gate 1582c goes to 1 logic 0. This stops the ring counter at whatever count is it is on when the count data signal goes down and thus preserves any remainder to be added to the next measurement to obtain a more accurate average, as will presently become more evident.

A set of division program lines indicated collectively by the reference numeral 1587 enable one, and only one, of gates 1584, 1588, 1590, 1592 and 1594. When gate 1584 is enabled by the program lines, the output of gate 1582 goes to a logic 1, line 1596 goes to a logic 0 and the output of gate 1598 goes to a logic 1 thus enabling gates 1545 and 1546 so that the data counter will be instructed to count in either the forward or reverse directions depending upon the output of gate 1516. The data counter is then continuously enabled so long as the con count data line 1583 is at logic 1 and every clock pulse on line 1404 is counted. When a divide by two, three, four or five is programmed on lines 1587, the data counter is enabled only on every second, third, fourth or fifth clock pulse by changing the output of gate 1598 to a logic 1 level for one clock pulse period by operation of the ring counter 1599 as will now be described.

When a divide by two is programmed, the output from gate 1588 is logic 0 so that a logic 1 is applied to gate 1602 by reason of the inverter. Assuming that binary $D_2$ is in the 0 state, the feedback to the other input of gate 1602 is also at a logic 1 level. As a result, the output of gate 1602 is a logic 0 which is applied to one input of gate 1600. The other four inputs to gate 1600 are at a logic 1 level because at least one input to each of the gates 1603, 1604 and 1605 is at a 0 level. As a result of one input to gate 1600 being at 0 logic level, the output of gate 1600 is at a logic 1 level and the output of control gate d is at a 0 logic level. Therefore on the first clock pulse, binary $D_2$ complements to a 1 state. The feedback from the complement output of binary $D_2$ goes to a logic 0 which changes the output of gate 1602 to a logic 1. However, binary $D_2$ is always complemented back to 0 state on the next clock pulse because the complement output is also connected to another input to gate 1600, and this input is now at logic 0 so that the output of gate 1600 remains at a logic 1 level and the output of gate $d$ remains at a logic 0 level, thus complementing binary $D_2$ back to the 0 state. However, since the logic 1 at the complement p output of binary $D_2$ is again fed back to an input of gate 1602, the output of gates 1600 and $d$ remains unchanged so that binary $D_2$ complements on every clock pulse.

When binary $D_2$ is in the 1 state, gate 1586 has a logic 0 output and gate 1598 has a logic 1 output, thus enabling gates 1545 and 1546 so that the data counter will increment, either forward or backward, on the next clock pulse, i.e., on the clock pulse that binary $D_2$ complements back to the 0 state, disabling gates 1586, 1598, 1545 and 1546. Therefore the data counter counts every other clock pulse to provide a division by two.

The complement output of binary $D_2$ is connected to an input of gates 1602, 1603, 1604 and 1605, while the complement output of binary $D_3$ is connected only to an input of gates 1603, 1604 and 1605, and the complement output of binary $D_4$ is connected only to an input of gates 1604 and 1605, and the complement output of binary $D_5$ is connected only to an input of gate 1605. These connections are used to selectively reset the ring counter after the second, third, fourth or fifth clock pulses to provide a divide by three, four or five capability. For example, assume that a divide by three has been programmed. The output from gate 1584 is at a logic 1 due to one or more of the program lines being at a logic 0 level, thus enabling gate 1598. The outputs from gates 1588, 1592 and 1594 are also at logic 1 level due to 0 logic levels on one or more of the program input lines to these gates, but this output is inverted os that a logic 0 level is applied to the program inputs of gates 1602, 1604 and 1605. Thus the outputs of gates 1602, 1604 and 1605 must always be at a logic 1 level. The output of gate 1590 is at a logic 0 level because a divide by three has been programmed by bringing all input lines to gate 1590 up to a logic 1 level. This logic 0 output is inverted and applied as a logic 1 to the program input of gate 1603. Assume now that binaries $D_2$—$D_5$ are all in the 0 state. As a result, all inputs to gate 1603 are at a logic 1 state and the output of gate 1603 is a logic 0, the output of gate 1600 is a logic 1 and the output of gate $d$ is a logic 0 so that binary $D_2$ complements. After binary $D_2$ has complemented, the complement output of $D_2$ goes to a logic 0 level thereby changing the output of gate 1603 back to a logic 1 level. However, the output of gate 1600 is maintained at a logic 1 level as a result of the feedback from the complement output of binary $D_2$ and binary $D_2$ complements back to 0 state on the next clock pulse. As binary $D_2$ complements back to the 0 state, binary $D_3$ complements to the 1 state by the operation of gates $e$ and $a$ as heretofore described. Thus although the complement output of binary $D_2$ has returned to a logic 1 level, the output of gate 1603 remains at a logic 1 level because the feedback from the complement output of binary $D_3$ is now at a 0 level. Also, the feedback from the complement output of binary $D_2$ has returned to a 1 level, so that the output of gate 1600 returns to a 0 level and the output of gate $d$ returns to a 1 level so that binary $D_2$ does not again complement. Binary $D_3$ then complements back to 0 state on the third clock pulse as a result of gates $e$ and $a$. Then all three inputs to gate 1603 are again at a logic 1 level so that its output is a logic 0, the output of gate 1600 is a logic 1 and the output of gate $d$ is a logic 0. Therefore binary $D_2$ once again complements to repeat the cycle. Thus it will be noted that binary $D_2$ complements on every third clock pulse and that either the forward or reverse signal to the data counter is gated through to the data counter during every third clock pulse by the operation of gates 1586 and 1598 and either gate 1545 or gate 1546. It will also be noted that binaries $D_4$ and $D_5$ complement to the 1 state on successive clock pulses but this is of no consequence when dividing by three. To divide by four, the program inputs to gate 1592 are at a logic 1 level. Then when binaries $D_2$, $D_3$ and $D_4$ are all in the 0 state, the output of gate 1604 will go to 0 level and binary $D_2$ will be reset on every fourth clock pulse. Similarly, when the output of gate 1594 is logic 0, binary $D_2$ will be reset to the 1 state on every fifth clock pulse.

From the preceding description, it will be noted that the data counter may be operated so as to add or subtract during either major scan I or major scan II. Further, if the data counter is not reset between successive tests, the ring counter 1599 may be used to divide the total counts from a number of successive tests, either static or dynamic, to provide a direct indication of the average of the successive tests. For example, if the data counter is reset to zero and then four successive tests run without resetting the counter while dividing by four with the ring counter, the final count on the data counter will be a direct reading of the average value of the four tests.

When making a static test, the sample clock of the digital synchronization system 300 is programmed at 1,000 counts per second in order to provide a precise 2 millisecond count period during which the pulses from the pulse shaper 278 are counted as will now be described. After a test start signal on line 1560, binaries $S_4$ and $S_5$ generate a data counter preset pulse from either gate 1566 if a preset is programmed on line 1567, or gate 1568 if autorange is programmed on line 1571 and the preset pulse passed through gate 1570 to the data counter as heretofore described. A preset pulse is also generated by gate 1564 which presets binaries $S_6$, $S_7$, $S_8$ and DR to the 0 state.

Binaries $S_6$, $S_7$ $S_8$ will remain the the preset state because binary $S_1$ is set to logic 0 when line 1620 from the static measuring system 230 is at a 0 logic level. The J* and K* inputs of binary $S_6$ are connected to a logic 1 level voltage source, and the J and K inputs of binary $S_7$ are connected to a logic 0 level, i.e., ground. The true output of binary $S_6$ and the complement output of binary $S_7$ are connected to the inputs of a gate 1622. The output of gate 1622 and the true output of binary $S_1$ are connected to the inputs of gate 1624. The output of gate 1624 is connected through an inverter 1626 to the J and K inputs of binary $S_6$ and to one input of gate 1628. The complement output of binary $S_6$ is connected to the other input of gate 1628, and the output of gate 1628 is connected to the J* and K* inputs of binary $S_7$. Thus when binaries $S_1$, $S_6$ and $S_7$ are all in the 0 state, the output of gate 1622 is a logic 1, the output of gate 1624 is a logic 1, and the output of inverter 1626 is a logic 0. Thus inputs J and K of binary $S_6$ are at logic 0 and binary $S_6$ will not complement on the clock pulses. Since both inputs to gate 1628 are at logic 0 level, the output is at logic 1 so that binary $S_7$ will not complement.

The true output of binary $S_7$ is connected to the J* and K* inputs of binary $S_8$ so that the logic 0 level steers binary $S_8$ to a 0 state. As a result, gate 1582$b$ is disabled and the output from gate 1582$c$ is a at a logic 0 level so that the data counter is disabled.

When line 1620 goes to a logic 1 state, indicating that the frequency from the voltage-to-frequency converter 274 is representative of the voltage or current to be measured, binary $S_1$ goes to a logic 1 level on the first low speed clock pulse on line 1562. On the second low speed clock pulse, both binaries $S_6$ and $S_7$ are complemented to the logic 1 level because the output of gate 1624 has gone to a logic 0, the output of inverter 1626 has gone to logic 1 to complement binary $S_6$, and the output of gate 1628 has gone to logic 0 to complement binary $S_7$.

On the third clock pulse, binary $S_8$ switches to a 1 state as a result of the logic 1 at the true output of binary $S_7$. It will be noted that binary $S_8$ is operated by the clock pulse from the pulse shaper 278 which is derived from the voltage-to-frequency converter of the static measuring subsystem through gate 1504. Thus on the first clock pulse derived from the voltage-to-frequency converter after binary $S_7$ has changed to a logic 1 state, the data counter is enabled through gates gate 1582 to commence counting the pulses derived from the voltage-to-frequency converter. Thus the function of binary $S_8$ is to synchronize the count enable signal from gate 1582 with the pulses from the voltage-to-frequency converter to insure proper operation of the data counter which is also clocked by the pulses from the voltage-to-frequency converter.

Also on the third low speed logic clock to line 1562, binary $S_6$ complements back to a 0 state because after the preceding clock pulse, the output from gate 1622 will still be a logic 1 and the output from inverter 1626 will still be a logic 1. However, binary $S_7$ does not complement because the output of gate 1628 reverted to a logic 1 level when binary $S_6$ complemented. On the fourth clock pulse, the output of gate 1628 again goes to a logic 1 level and binary $S_7$ complements back to the 0 state. Synchronizing binary $S_8$ then reverts to a 0 state on the next clock pulse from the voltage-to-frequency converter to stop the data count. Thus the period during which binary $S_8$ is in the 1 state and the data counter is counting is two low speed clock pulses, and is therefore 2 milliseconds.

It should be noted that binary $S_6$ also complements back to the logic 1 state on the fourth clock pulse because when binary $S_7$ is in the 1 state and binary $S_6$ is in the 0 state, the output of gate 1622 is still logic 1. After the fourth clock pulse when binary $Sd_7$ goes to the 0 state and binary $S_6$ goes to the 1 state, the output of gate 1622 goes to logic 0 level thus insuring that neither binary $S_6$ nor $S_7$ can again complement and thereby a insuring that a second gate pulse is not transmitted to binary $S_8$ until binaries $S_6$ and $S_7$ have again both been reset to 0 state.

When line 1620 went to a logic 1 level, binary $S_1$ went to the 1 state on the next clock pulse, binary $S_2$ went to the 1 state on the second clock pulse, and binary $S_3$ when to 1 state on the third clock pulse. However, the output of gate 1652 never went to logic 0 because either the complement output of binary $S_2$ or the true output of binary $S_3$ is always at 0 logic level. When line 1520 goes to 0 logic level after 5 milliseconds, however, binary $S_1$ goes back to 0 state on the first clock pulse thereafter and binary $S_2$ goes back to the 0 state on the second clock pulse. Therefore, unless line 1650 has gone to a logic 1 level to indicate that the test is complete within 2 milliseconds after line 1620 goes to 0 level, the output of gate 1652 will go the to logic 0 causing gate 1569 to reset binaries $S_6$, $S_7$, $S_8$ and DR and gate 1570 to preset the data counter to zero. If the down range binary DR has not complemented prior to the time that line 1620 goes to 0 level after 5 milliseconds, no test complete signal will be produced on line 1650 and the static measuring subsystem will automatically down range, provided automatic ranging has been programmed. The down range binary DR is controlled by the output from gate 1654 which derives inputs from both the data counter 286 and the binary-to-decimal decoder 514 on lines 1656, 1657 and 1658. Unless the data counter reaches a count of 199, which is arbitrarily selected as 20 percent of an arbitrarily selected full range, one or more of these lines will remain at a logic 0 level and the output of gate 1654 will remain at a logic 1 level so that binary DR will not complement. However, as soon as all of lines 1656—1658 go to a logic 1 level, indicating that the count of 199 has been reached, the output of gate 1654 will go to a logic 0 level and the down range binary DR will complement, thus instructing the static measuring subsystem 230 that the proper range is being used. The static measuring subsystem 230 also receives a signal from the data counter 286 indicating when a count corresponding to 200 percent of full range has been reached, which in the present case is a count of 1,999, and automatically up-ranges one range after having down ranged.

In the event the counter reaches a count of 3,999, all inputs 1680 from the binary-to-decimal decoder to go to a logic 1 level so that the output of gate 1682 goes to a logic 0. This disables the gate 1582 and thereby disables the data counter until such time as the data counter is reset.

Each of the digital comparators 502 and 504 is comprised of the logic circuit shown in FIG. 20. The digital comparator is comprised of five decades 01, 02, 03, 04 and 05. Each decade has four comparator bits and each bit is comprised of a pair of NAND gates A and A'B and B', C and C', and D and D'. At each bit a binary data number is compared with a binary limit number. For example, at bit AA' of decade 01, a true data line D goes to gate A and a complement data line D goes to gate A'. A true limit line L also goes to gate A' and a complement limit line L goes to gate A. The logic of the comparator is such that the greatest order bit is considered first, and if this bit reaches either a "less than" or a "greater than" decision, a final decision is made. If the data number and logic number are equal at the greatest order bit, then the next order bit is considered, etc. In each decade, the AA' bit is the first order bit, the BB' bit is the second order bit, the CC' bit is the third order bit, and the DD' bit is the last order bit. Similarly, decade 01 is the first order decade and decade 05 is the last order decade.

It is to be understood that the comparator may be used to compare any information which may be expressed in a binary code in which the bits may be s assigned an order. In the present application the sign is the greatest order bit and therefore the sign of the data is compared with the sign of the limit in bit AA' of decade 01, with positive being assigned the greater value. The system has a sufficient number of different ranges as to require five binary bits. The ranges are numbered in reverse order such that a particular number in the first range is the greatest and the corresponding number in each successively numbered range is less. Thus bit BB' of decade 01 is designated as the $R^0$ bit, bit CC' is the $R^1$ bit, and DD' is the $R^2$ bit. Bit AA' of decade 02 is the $R^3$ bit and bit BB' is the $R^4$ bit. The range data information is supplied by the range and type decoder. Then bit CC' of decade 02 is the $TH^0$ bit and the true data line D is the true output of binary $TH^0$ of the data counter and the complement data line D is the complement output of binary $TH^0$. Similarly, the true and complement outputs of binary $TH^1$ of the data counter are connected to the inputs of gates D and D', respectively. In the third decade, bit AA', although not illustrated, is connected to binary $H^3$ of the hundreds decade, bit BB' to binary $H^2$, bit CC' to binary $H^1$ and bit DD' to binary $H^0$. Similarly, the four bits of decade 04 are connected to the corresponding binaries of the tens decade of the data counter, and the bits of decade 05 are connected to the corresponding binaries of the units decade of the data counter. All limit data comes from the minimum and maximum memories 506 and 507.

The truth table for each bit is shown in FIG. 21, a bit AA' being illustrated. It will be noted from the table that when the data number is equal to the limit number, a logic 1 and a logic 0 will be applied to each of gates A and A', so that the output of each gate will be a logic 1. If the data number is greater than the limit number, both inputs to gate A will be logic 1 and both inputs to gate A' will be logic 0. Conversely, if the data number is less than the limit number, both inputs to gate A will be logic 0 and both inputs to gate A' will be logic 1. Thus when the data number is equal to the limit number, either when both are logic 1 or both are logic O, the outputs of gates A and A' are both at logic 1. When the data number is logic 1 and the limit number is logic 0, i.e., when the data number is greater than the limit number, the output of gate A is logic 0 and the output of gate A' is logic 1. When the data number is logic 0 and the limit number is logic 1, i.e., when the data is less than the limit number, the output of gate A is a logic 1 and the output of gate A' is a logic 0. Thus it will be noted that the output from gate A' is a logic 0 only when the data number is less than the limit number, and conversely, that the output of gate A is at 0 logic level only when the data number is greater than the limit number at that bit. Thus a "greater than," "less than" or "equal to" decision can be reached at each bit position. The digital comparator first compares the data number at the highest order bit. If either a "greater than" or "less than" decision is reached, the decision is of necessity valid for the entire data number and all subsequent bits of all subsequent decades are disabled and not considered. If an "equal to" decision is reached at the highest order bit, the next order bit is considered and the process repeated. If all bits of a decade are equal, then the highest order bit in the next lower order decade is enabled and the procedure repeated.

Now referring to bit AA' of decade 01, assume that the data number is less than the limit number so that the output of gate A' is a logic 0. NAND gate $e$ then can only have an output of logic 1, thus indicating that the data number, at the highest order bit AA' of decade 01, is less than the limit number, and hence that the entire data number applied to all of the bits of all of the decades is less than the limit number. Thus when the output of gate $e$ is a logic 1, the entire data number must be less than the entire limit number as will hereafter be further described.

The output of gate $e$ is fed through gate $f$, which acts merely as an inverter, to the input of gate $g$. The output of gate $g$ can then only be a logic 1 level regardless of the other inputs from gates A, B, C and D, so that the outputs from these gates are disregarded and gate $g$ is in effect disabled. The output from gate $g$ is inverted by gate $h$, inverted again by gate $i$ and inverted again by gate $j$, so that the output of gate $j$ will be at a logic 0. Thus when the data number is less than the limit number at bit AA' so that the output of gate $e$ goes to a logic 1 level, the output of gate $j$ will then be at a logic 0 level, This causes the output of gate $k$ to go to a logic 1 which is applied to gate $l_1$. Also, the logic 0 output from gate $j$ causes the output of gate $i$ of decade 02 to go to a logic 1 which is inverted by gate $j$ to a logic 0 which in turn causes gate $k$ of decade 02 to go to a logic 1. The logic 1 on the "less than" line at the output of gate $e$ of decade 01 is then inverted and applied together with the outputs of gates $k$ from decades 01 and 02 to the input of gate $l_1$, so that the output of gate $l_1$ is a logic 1, the output of gate $l_3$ is a logic 0 and the output of gate $l_5$ is a logic 1, thus indicating a "less than" decision. This logic 1 is gated through gate $o$ and through gate $p$, the other outputs of which are at a logic 1 level for reasons which will presently be described, so that the "less than" output line 1800 will be at a logic 1 level to indicate that the data number is less than the limit number. The output from gate $p$ is inverted and applied to gate $q$ so that the output of gate $q$ is also at a logic 1 level, which is inverted to a logic 0 level on the "greater than" output line 1802.

If on the other hand, the data number is greater than the limit number, the output of gate A' will be a logic 1 and the output of gate A will be a logic 0 which causes the output of gate $g$ to go to a logic 1 level regardless of the outputs of gates B, C and D, and the logic 0 at the output of gate $g$ results in a logic 0 level at the output of gate $j$. Thus the output of gate $j$ is a logic 0 when the data number is less than the limit number due to the feedback through gate $f$, and is logic 0 if the data number is greater than the limit number due to the output of gate A. When the output of gate A is a logic 0, indicating that the data number is greater than the limit number, gates B', C' and D' are disabled by the 0 output from gate A so that the output of gate $e$ will be disabled and cannot be logic 1 and therefore cannot indicate a "less than" decision even if a "less than" condition is present at a lower order bit.

Assume now that the data number is equal to the limit number such that the output from both gates A and A' will be at a logic 1 level. Neither the output of gate $e$ nor of gate $g$ will be affected by the equals decision at bit AA'. Since the output from gate A is a logic 1, gate B' is enabled.

The data number and the limit number are then compared at bit BB'. If the data number is "less than" or "greater than" the limit number, a decision is reached in the same manner heretofore described with regard to bit AA' and the output of gate $j$ is a logic 0 and the output of gate $e$ is either a logic 1 if a "less than" decision is reached, or a logic O if a "greater than" decision is reached. If bit BB' reaches an "equals" decision, then bit CC' is enabled by the logic 1 output of gates A and B and the data number at bit CC' compared with the limit number. Again, if the data number is "greater than" or "less than" the limit number at bit CC', a decision is reached. If not, the logic 1 output of gates A, B and C enable gate D' which may make either the "less than" or "greater than" decision which will be conclusive.

If all four bits AA' and through DD' are equal, then the output of gate $e$ will be a logic 0 and the output of gate $j$ will be a logic 1 as a result of the logic 0 at the output of gate $g$. Thus it will be noted that a "less than," "equal to" or "greater than" decision is made in decade 01, the "less than" decision being a logic 1 at the output of gate $e$, an "equal to" decision being a logic 1 at the output of gate $j$, and a "greater than" decision being a logic 0 output at gates $e$ and $j$.

The method in which a "less than" decision by decade 01 is gated out on line 1800 has been described. When a "greater than" decision is reached in decade 01, the outputs of both gates $e$ and $j$ are a logic 0. A logic 1 is then applied by inverter gate 1804 to an input of gate $l_1$. The logic 0 output of gate $j$ causes gate $k$ of decade 01 to be a logic 1 which is also applied to an input of gate $l_1$. The logic 0 output of gate $j$ also causes the gates $k$ of decades 02, 03, 04 and 05 to be at a logic 1 level because the gates $j$ of each decade are connected to one input of gate $k$ of that decade and to an input of gate $i$ of the next succeeding decade. Thus all inputs to gate $l_1$ and $l_2$ are at a logic 1 level so that the output of gate $l_5$ is a logic 1. As a result, line 1800 is at a logic 0 level, and line 1802 is at a logic 1 level by reason of inverter 1806, the gate $q$ and inverter 1808. Gate $k$ of decade 05 is at a logic 1 level so that output line 1810 is at a logic 0 level by reason of the inverter 1812.

If an "equal to" decision is reached in decade 01, the output from gate $e$ is a logic 0 and the output from gate $j$ is a logic 1. Then both the outputs of gates $e$ and $g$ of decade 02 are enabled by enabling gate $k$ of decade 01 and gate $i$ of decade 02, respectively. A "less than" decision reached in decade 02 can then be gated through gate $k$ of decade 01 to gate $l_1$ and thence to output line 1800 in the same manner heretofore described. Similarly, if a "greater than" decision is reached, the output of gate $j$ of decade 02 will be a logic 0 and this will disable gates $k$ of decades 02, 03, 04 and 05 so that a "less than" decision cannot be reached in any of these succeeding decades, thus producing a "greater than" decision on line 1802 by reason of the inverted "less than" decision. If an "equal to" decision is reached in decade 02, the logic 1 output from gate $j$ then enables the output of gate $e$ of decade 03 by enabling gate $k$ of decade 02, and enables the output of gate $g$ of decade 03 by enabling gate $i$ of decade 03.

If decade 03 reaches a "less than" decision, this decision is gated out through gate $l_1$ by causing gate $k$ of decade 02 to go to a logic 0. If a "greater than" decision is reached, the outputs of gates $i$ of all succeeding decades will go to a logic 1 so that the outputs of gates $k$ of these decades will be at a logic 1. As a result, the output of gate $l_5$ is a logic 0 which results in a logic 1 on the "greater than" line 1802 and a logic 0 on the "less than" line 1800, as heretofore described. A "less than" or "greater than" decision at either decade 04 or decade 05 produces the same results.

If all of the decades reach an "equal to" decision, the output of gate $l$ will be a logic 0 because the outputs of all gates $e$ will be at logic 0 thus making the outputs of all gates $k$, except gate $k$ of decade 05, a logic 1. However, gate $k$ of decade 05 will be at a logic 0 level because both inputs are at a logic 1. This logic 0 is inverted by inverter 1812 and appears as a logic 1 on the "equal to" output line 1810. Since the output of gate $l$ is a logic 0 because the outputs of all gates $e$ are logic 0, the "less than" output line 1800 will be at logic 0. The "greater than" output line 1802 would normally be at logic 1 since it is merely the complement of the "equal to" line 1800, but the logic 0 from gate $k$ of the decade 05 disables gate $q$ so that the output of inverter 1808 and hence the level on line 1802 is a logic 0.

It will be recalled that the highest order bit when comparing two algebraic numbers is the sign, and that the sign data is applied to bit AA' of decade 01. When the data sign and the limit sign are both positive, or if either one is positive, then the "- greater than" and "less than" decisions of the remaining bits of the comparator may be based upon the signs of the two numbers or upon the relative absolute values of the binary numbers. However, if both the data number and the limit number have a negative sign, then the lesser absolute numeric value is in actuality the greater algebraic value so that the "less than" or "greater than" decision at the output of gate *p* must be inverted. This is accomplished by gate *r* the inputs of which are connected to the D and L lines of bit AA'. Thus when the sign of the data number and the sign of the limit number are both negative, both inputs to gate *r* will be at a logic 1 level and the output of gate *r* will be a logic 0. This disables gate *o* and enables gate *n* through inverter 1814. The output from gate $l_s$, which is the true "less than" output, is then inverted as it passes through gates *m, n* and *p* so that the outputs of the "less than" and "greater than" lines 18 1800 and 1802 will be complemented. It will be noted that the output from gate *k* of decade 05 is also connected to an input of gate *n* so that gate *n* will be disabled when the output of gate *k* of decade 05 goes to a logic 0 when an "equal to" decision has been reached for the reasons heretofore mentioned in connection with gate *q*.

In carrying out a series of tests on a particular electronic device, the special socket 22 and socket board 24 are connected to the relay test station 25 by the connectors 30. The code programmed on the printed circuit co board 24 is fed through the contacts 34 to the control unit 250 for identification purposes to insure that the proper socket is used. The printed circuit performance board 28 is wired so that the proper leads of the test device will be connectable to the necessary DC bias supplies 01—010 and to the proper pulse generator I or II by closing one of the relays R $L_nR_n$. Various loads, represented by the resistor 144 in FIG. 3, may also be connected between the appropriate terminals on the performance board 28 as required.

The drawer 98 is pulled out and the performance board 28 laid in place on the tray 90 and the connectors 120 engaged so that the pulse generators I and II will be connected to the buses $DP_1$ and $DP_2$. The connectors 142 are forced over the edges of the board, the drawer pushed in, and the camming means 96 activated to lift the performance board until the button contacts 86 engage the respective spring contacts 68.

The programming media, such as punched paper, is programmed with information indicating the start of test No. 1 and each memory is successively programmed. The information for each memory is preceded by the address of for the memory. For the first test, all memories must be full because the memories are of the shift register type. A stop signal is placed on the program tape after all of the program information for the first test. Then each successive test is programmed in order on the tape followed by a stop signal. Since the memories are shift registers and are randomly addressable through the control unit 250, only those registers wherein the test criteria are to be changed need to be reprogrammed for subsequent tests. The program tape is then inserted in the programming unit 252.

The measuring system may be operated in either the automatic or manual mode. In the manual mode, each test is first programmed on a manual signal, then the test performed in response to a manual signal. After the test is performed, operation of the system ceases until the second test program is manually instigated. If desired, however, all tests on the program may be automatically performed once the system is set in operation to program test No. 1. After the final test is completed and the tape reaches the starting point for the first test, operation of the system is automatically terminated. Another device may then be inserted in the socket and the series of tests repeated.

Although portions of the control circuits, such as the dynamic sequence timetable and the dynamic sequence interface, have not be described in detail, the logic function of these various control circuits have been described in sufficient detail to permit one skilled in the art to design a suitable logic circuit. The staircase counter 364 may be substantially identical to the data counter 286, differing in that the reverse count logic is not required and in the manner in which the decades overflow as heretofore described. The staircase in ladder network 358 may be of the same configuration as the percent DAC 456, except that a greater number of decades are provided. The staircase control 362 may merely comprise three sets of AND gates, each including a gate for each input of the staircase ladder, which correspond in number to the outputs of the counter 364. Any one of the three sets of gates may be selectively enabled by the lines N-I, N-II or C to effect the operation of the staircase ladder 358 as heretofore described.

From the above description it will be apparent to those familiar with the art that a novel and highly useful measurement system has been described. The system may be used to perform substantially any measurement on substantially any electronic component or circuit. The system is capable of performing a wide variety of static measurements and a wide variety of dynamic measurements, and is fully automatic.

Although a preferred embodiment of the invention has been described in detail, it is to be understood that various changes, substitutions and alterations could be made in the various components and subsystems, and in the arrangement and combination thereof, without departing from the spirit and scope of the invention as defined by the appended claims.

We claim:

1. In a system for making differential measurements based on successive measurement periods, the combination of:

means for producing a pulse train in which the number of pulses for a determined period is representative of the measurement during one of the measurement periods;

bidirectional counter means for counting the pulses during the determined period;

control means for the counter means for operating the counter in the proper direction to perform the algebraic function between successive measurement periods necessary to provide the desired differential measurement;

comparator means connected to the counter for comparing the data represented by the count of the counter with a programmed limit number and producing a logic signal representative of the relative value of the two numbers, the comparator means comprising a plurality of comparator stages each comprised of first gate means for producing the logic product of the true data bit value and the complement limit bit value at its output and second gate means for producing the logic product of the complement data bit value and the true limit bit value at its output;

fourth logic means connected to the outputs of the second gate means of each stage for producing a first logic level indicative of one decision other than an "equal" decision at any stage and a second logic level indicative of a decision other than said one decision;

fifth logic means interconnecting an output at each stage and an input of the second gate means of each lower order stage for disabling the lower order stage when a decision other than an "equal" decision or said one decision is reached at the stage;

sixth logic means connected to the outputs of the second gate means at each stage for producing a first logic level when an "equal" decision is reached at all stages and a second logic level when other than an "equal" decision is reached at any stage; and seventh logic means connected to the output of the forth logic means and to an input of the sixth logic means for disabling the sixth logic means by producing said second logic level at its output when the output of the fourth logic means is at said first logic level.

2. The combination of defined in claim 1 wherein:

the combination defined in claim 1 is a decade in which the outputs of the fourth and sixth logic means are the outputs of the decade and there are a plurality of such decades;

eighth logic means connecting the outputs of the sixth logic means of each decade to the sixth logic means of the next lower order decade to enable the sixth logic means of the next lower order decade when the output of the sixth logic means of the higher order decade is at said first logic level indicative of an "equal" decision at all bits of the decade, and for disabling the sixth logic means of the next lower order decade if other than an "equal" decision is reached in the higher order decade;

ninth logic means connected to the output of the fourth logic means of each decade for producing a logic level indicative of said one decision when said one decision is reached at a decade and an "equal" decision is reached at all higher order decades; and tenth logic means connected to the output of the sixth logic means of the lowest order decade for producing a logic level indicative of an "equal" decision when an "equal" decision is reached at all decades.

3. The combination defined in claim 2 further characterized by:

eleventh logic means connected to the outputs of the ninth and tenth logic means for producing a logic level indicative of said other decision when the ninth logic means does not indicated indicate said one decision and tenth logic means does not indicate an "equal" decision.

4. The combination defined in claim 3 wherein one of the bits of the data and limit numbers represents the sign and further characterized by:

logic means connected to the ninth and eleventh logic means for complementing the logic levels of the outputs of the ninth and tenth logic means when the signs of both the data number and limit number are negative and a decision other than "equal" is reached by the comparator.

5. In a system for making differential measurements based on successive measurement periods, the combination of:

means for producing a pulse train in which the number of pulses for a determined period is representative of the measurement during one of the measurement periods;

bidirectional counter means for counting the pulses during the determined period, the counter means comprising;

a count forward input having "forward" and "not forward" logic levels, a count in reverse input having "reverse" and "not reverse" logic levels, and a plurality of binary stages each having a clock input, first and second input means, a complement mode when the "forward" and "not reverse" logic levels are applied to the first and second input means, respectively, a complement mode when the "not forward" and "reverse" logic levels are applied to the first and second input means, respectively, and a noncomplement mode when "not forward" and "not reverse" logic levels are applied to the first and second input means, respectively;

clock means connected to continuously apply the pulses of a clock pulse train to the clock inputs of the binary stages;

first logic means for applying the "forward" logic level at the count forward input to the first input means of the binary stages in a sequence to cause the binary stages to complement on successive clock pulses in a predetermined sequence to count forward and for continuously applying the "not reverse" logic level to the second input means of all binaries;

second logic means for applying the "reverse" logic level of the count in reverse input to the second input means of the binary stages in a sequence to cause the binary stages to complement on successive clock pulses in a predetermined sequence to count in reverse and for continuously applying the "not reverse" logic level to the second inputs of all binaries;

third logic means connected to the counter for producing a "zero" logic level when the counter is at the count of zero and a "not zero" logic level when the counter is at any other count;

fourth logic means for producing an "add" logic level and a "substract" logic level in response to input control signals;

fifth logic means for producing a "count" logic level and a "not count" logic level in response to the count signal;

sixth logic means for producing a "positive" logic level when the data represented by the count of the counter is positive and a "negative" logic level when the data represented by the count of the counter is negative;

seventh logic means connected to the outputs of the third, fourth, fifth and sixth logic means for producing at the respective forward and reverse inputs;

1. a "not forward" logic level and a "not reverse" logic level during a "not count" logic level at the fifth logic means, 2. a "forward" logic level and a "not reverse" logic level during a "count" logic level and during, a. a "zero" logic level at the third logic means;
   b. an "add" logic level at the fourth logic means and a "positive" logic level at the sixth logic means; or
   c. a "substract" logic level at the fourth logic means and a "negative" logic level at the sixth logic means; and 3. a "not forward" logic level and a "reverse" logic level during a "count" logic level at the fifth logic means; and a. a "not zero" logic level at the third logic means and a "substract" logic level at the fourth logic means and a "positive" logic level at the sixth logic means; or
   b. a "not zero" logic level at the third logic means and an "add" logic level at the fourth logic means, and a "negative" logic level at the sixth logic means; and control means for the counter means for operating the counter in the proper direction to preform the algebraic function between successive measurement periods necessary to provide the desired differential measurement.

6. The combination defined in claim 5 wherein the fifth logic means includes:

a second counter comprised of a plurality of binary stages interconnected by eight logic means for successively complementing to a logic 1 state on successive clock pulses applied to the counter after the first binary stage complements to a logic 1 state, the output of the first binary stage being the output of the fifth logic means;

ninth programmable logic means interconnecting the outputs of the binary stage of the second counter and the inputs of the first binary stage of the second counter for complementing the first binary stage to a logic 1 state after a selected binary stage has complemented to a logic 1 state; and tenth logic means connected to disable the eighth logic means and the output of the first binary stage in the absence of an enabling control signal.

7. The combination defined in claim 6 wherein fifth the fifth logic means further includes:

logic means for selectively, by a programmed control signal, producing a count signal having a duration representative of the data value to be measured or, in the alternative, for producing a count signal of a predetermined reference period; and logic means for selectively, by said programmed control signals, gating through a constant frequency clock pulse train to the counter or, in the alternative, for gating through a clock pulse train having a modulated frequency representative of the data value to be measured.

8. The combination defined in claim 7 wherein the logic means for producing a count signal of a predetermined reference period is comprised of:

counter means for counting a predetermined number of pulses of a constant frequency clock pulse train to produce a first logic signal having a duration equal to said predetermined number of clock pulses; and synchronous logic means operated in synchronism with the modulated frequency clock pulse train for producing a second logic signal for controlling said counter, said second logic signal starting on the first clock pulse of the modulated frequency clock pulse train after the start of the first logic signal and terminating on the first clock pulse of the modulated frequency clock pulse train after the termination of the first logic signal.

9. In a counter for a data readout system, the combination of:
- a count forward input having "forward" and "not forward" logic levels;
- a count in reverse input having "reverse" and "not reverse" logic levels;
- a plurality of binary stages each having a clock input, first and second input means, a complement mode when the "forward" and "not reverse" logic levels are applied to the first and second input means, respectively, a complement mode when the "not forward" and "reverse" logic levels are applied to the first and second input means, respectively, and a noncomplement mode when "not forward" and "not reverse" logic levels are applied to the first and second input means, respectively;
- clock means connected to continuously apply the pulses of a clock pulse train to the clock inputs of the binary stages;
- first logic means for applying the "forward" logic level at the count forward input to the first input means of the binary stages in a sequence to cause the binary stages to complement on successive clock pulses in a predetermined sequence to count forward and for applying the "not forward" logic level to the first input means of all binaries; and
- second logic means for applying the "reverse" logic level of the count in reverse input to the second input means of the binary stages in a sequence to cause the binary stages to complement on successive clock pulses in a predetermined sequence to count in reverse and for applying the "not reverse" logic level tot to the second inputs of all binaries.

10. The combination defined in claim 9 wherein:
the binary stages are J-K flip-flops, the J* and K* inputs are one input means, and the J and K inputs are the other input means.

11. The combination defined in claim 9 wherein there are four binary stages forming a decade for counting forward from zero to nine and resetting to zero and for counting in reverse from zero to one and resetting to zero.

12. The combination defined in claim 11 wherein the binary stages count in a 1:2:4:8 code.

13. The combination defined in claim 12 wherein there are a plurality of cascaded decades.

14. In a counter for a data readout system, the combination of:
- a count forward input having "forward" and "not forward" logic levels;
- a count in reverse input having "reverse" and "not reverse" logic levels;
- a plurality of binary stages each having a clock input, first and second input means, a complement mode when the "forward" and "not reverse" logic levels are applied to the first and second input means, respectively, a complement mode when the "not forward" and "reverse" logic levels are applied to the first and second input means, respectively, and a noncomplement mode when "not forward" and "not reverse" logic levels are applied to the first and second input means, respectively;
- clock means connected to continuously apply the pulses of a clock pulse train to the clock inputs of the binary stages;
- first logic means for applying the "forward" logic level at the count forward input to the first input means of the binary stages in a sequence to cause the binary stages to complement on successive clock pulses in a predetermined sequence to count forward and for continuously applying the "not reverse" logic level to the second input means of all binaries;
- second logic means for applying the "reverse" logic level of the count in reverse input to the second input means of the binary stages in a sequence to cause the binary stages to complement on successive clock pulses in a predetermined sequence to count in reverse and for continuously applying the "not reverse" logic level to the second inputs of all binaries;
- third logic means connected to the counter for producing a "zero" logic level when the counter is at the count of zero and a "not zero" logic level when the counter is at any other count;
- fourth logic means for producing an "add" logic level and a "substract" logic level in response to input control signals;
- fifth logic means for producing a "count" logic level and a "not count" logic level in response to an input control signal;
- sixth logic means for producing a "positive" logic level when the data represented by the count of the counter is positive and a "negative" logic level when the data represented by the count of the counter is negative;
- seventh logic le means connected to the outputs of the third, fourth, fifth and sixth logic means for producing at the respective forward and reverse inputs;
  1. a "not forward" logic level and a "not reverse" logic level during a "not count" logic level at the fifth logic means,
  2. a "forward" logic level and a "not reverse" logic level during a "count" logic level and during:
     a. a "zero" logic level at the third logic means;
     b. an "add" logic level at the fourth logic means and a "positive" logic level at the sixth logic means; or
     c. a "substract" logic level at the fourth logic means and a "negative" logic level at the sixth logic means; and
  3. a "not forward" logic level and a "reverse" logic level during a "count" logic level at the fifth logic means; and
     a. a "not zero" logic level at the third logic means and a "substract" logic level at the fourth logic means and a "positive" logic level at the sixth logic means; or
     b. a "not zero" logic level at the third logic means and an "add" logic level at the fourth logic means, and a "negative" logic level at the sixth logic means.

15. The combination defined in claim 14 wherein the fifth logic means comprises:
- a second counter comprised of a plurality of binary stages interconnected by eight logic means for successively complementing to a logic 1 state on successive clock pulses applied to the counter after the first binary stage complements to a logic 1 state, the output of the first binary stage being the output of the fifth logic means;
- ninth programmable logic means interconnecting the outputs of the binary stage of the second counter and the inputs of the first binary stage of the second counter for complementing the first binary stage to a logic 1 state after a selected binary stage has complemented to a logic 1 state; and
- tenth logic means connected to disable the eighth logic means and the output of the first binary stage in the absence of an enabling control signal.

16. In a digital data readout system, the combination of:
- a bidirectional synchronous counter having forward and reverse inputs for counting forward when a "forward" logic level is on the forward input and a "not forward" logic level on the reverse input, for counting in reverse when a "not forward" logic level is on the forward input and a "reverse" logic level is on the reverse input, and for not counting when a "not forward" logic level is on the forward input and a "not reverse" logic level is on the reverse input;
- third logic means connected to the counter for producing a "zero" logic level when the counter is at the count of zero and a "not zero" logic level when the counter is at any other count;

fourth logic means for producing an "add" logic level and a "substract" logic level in response to input control signals;

fifth logic means for producing a "count" logic level and a "not count" logic level in response to an input control signal;

sixth logic means for producing a "positive" logic level when the data represented by the count of the counter is positive and a "negative" logic level when the data represented by the count of the counter is negative;

seventh logic means connected to the outputs of the third, fourth, fifth and sixth logic means for producing at the respective forward and reverse inputs;
1. a "not forward" logic level and a "not reverse" logic level during a "not count" logic level at the fifth logic means;
2. a "forward" logic level and a "not reverse" logic level during a "count" logic level and during
   a. a "zero" logic level at the third logic means;
   b. an "add" logic level at the fourth logic means and a "positive" logic level at the sixth logic means; or
   c. a "substract" logic level at the fourth logic means and a "negative" logic level at the sixth logic means; and
3. a "not forward" logic level and a "reverse" logic level during a "count" logic level at the fifth logic means; and
   a. a "not zero" logic level at the third logic means and a "substract" logic level at the fourth logic means and a "positive" logic level at the sixth logic means; or
   b. a "not zero" logic level at the third logic means and an "add" logic level at the fourth logic le means, and a "negative" logic level at the sixth logic means.

17. The combination defined in claim 16 wherein the fifth logic means comprises:

a second counter comprised of a plurality of binary stages interconnected by eighth logic means for successively complementing to a logic 1 state on successive clock pulses applied to the counter after the first binary stage complements to a logic 1 state, the output of the first binary stage being the output of the fifth logic means;

ninth programmable logic means interconnecting the outputs of the binary a stage of the second counter and the inputs of the first binary stage of the second counter for complementing the first binary stage to a logic 1 state after a selected binary stage has complemented to a logic 1 state; and tenth logic means connected to disable the eighth logic means and the output of the first binary stage in the absence of an enabling control signal.

18. In a digital comparator for comparing a multibit binary data number with a binary limit number having an equal number of bits, the combination of:

a plurality of comparator stages each comprised of first gate means for producing the logic product of the true data bit value and the complement limit bit value at its output, and second gate means for producing the logic product of the complement data bit value and the true limit bit value at its output;

third gate logic means for producing an "equal" logic condition when the outputs at each comparator stage are at the same logic level, a "greater than" logic condition when the output of the first gate means of the highest order stage at which the outputs of the first and second gate means are not the same logic level is at a first logic level and the output of the second gate means is at a second logic level, and a "less than" logic condition when the output of the first gate means of the highest order stage at which the outputs of the first and second gate means are not the same logic level is at the second logic level and the output of the second gate means is at the first logic level, the third gate logic means including;

fourth logic means connected to the outputs of the second gate means of each stage for producing a first logic level indicative of one decision other than an "equal" decision at any stage and a second logic level indicative of a decision other than said one decision;

fifth logic means interconnecting an output at each stage and an input of the second gate means of each lower order stage for disabling the lower order stage when a decision other than than an "equal" decision or said one die decision is reached at the stage;

sixth logic means connected to the outputs of the second gate means at each stage for producing a first logic level when an "equal" decision is reached at all stages and a second logic level when other than an "equal" decision is reached at any stage; and seventh logic means connected to the output of the fourth logic means and to an input of the sixth logic means for disabling the sixth logic means by producing said second logic level at its output when the output of the fourth logic means is at said first logic level.

19. The combination defined in claim 18 wherein:

the combination defined in claim 18 constitutes a decade in which the outputs of the decade; at least one additional decade as defined in claim 18 which is a lower order decade;

eighth logic means connecting the outputs of the sixth logic means of each decade to the sixth logic means of the next lower order decade to enable the sixth logic means of the next lower order decade when the output of the sixth logic means of the higher order decade is at said first logic level indicative of an "equal" decision at all bits of the decade, and for disabling the sixth logic means of the next lower order decade if other than an "equal" decision is reached in the higher order decade;

ninth logic means connected to the output of the fourth logic means of each decade for producing a logic level indicative of said one decision when said one decision is reached at a decade and an "equal" decision is reached at all higher order decades; and tenth logic means connected to the output of the sixth logic means of the lowest order decade for producing a logic level indicative of an "equal" decision when an "equal" decision is reached at all decades.

20. The combination defined in claim 19 further characterized by:

eleventh logic means connected to the outputs of the ninth and tenth logic means for producing a logic level indicative of said other decision when the ninth logic means does not indicate said one decision and tenth logic means does not indicate an "equal" decision.

21. The combination defined in claim 20 wherein one of the bits of the data and limit numbers represents the sign and further characterized by:

logic means connected to the ninth and eleventh logic means for complementing the logic levels of the outputs of the ninth and tenth logic means when the signs of both the data number and limit number are negative and a decision other than "equal" is reached by the comparator.